(12) United States Patent
Suzuki

(10) Patent No.: US 11,239,522 B2
(45) Date of Patent: Feb. 1, 2022

(54) BATTERY PACK AND METHOD FOR MANUFACTURING BATTERY PACK

(71) Applicant: Envision AESC Energy Devices Ltd., Sagamihara (JP)

(72) Inventor: Toru Suzuki, Sagamihara (JP)

(73) Assignee: Envision AESC Energy Devices Ltd., Sagamihara (JP)

( * ) Notice: Subject to any disclaimer, the term of this patent is extended or adjusted under 35 U.S.C. 154(b) by 71 days.

(21) Appl. No.: 16/490,103

(22) PCT Filed: Sep. 27, 2017

(86) PCT No.: PCT/JP2017/034874
§ 371 (c)(1),
(2) Date: Aug. 30, 2019

(87) PCT Pub. No.: WO2018/163479
PCT Pub. Date: Sep. 13, 2018

(65) Prior Publication Data
US 2020/0014007 A1    Jan. 9, 2020

(30) Foreign Application Priority Data

Mar. 7, 2017  (JP) .............................. JP2017-042977

(51) Int. Cl.
*H01M 50/20* (2021.01)
*H01M 50/50* (2021.01)

(52) U.S. Cl.
CPC ........... *H01M 50/20* (2021.01); *H01M 50/50* (2021.01)

(58) Field of Classification Search
CPC .... H01M 50/20; H01M 50/50; H01M 50/502; Y02E 60/10
See application file for complete search history.

(56) References Cited

U.S. PATENT DOCUMENTS

| 2014/0011071 | A1* | 1/2014 | Suzuki | ................. H01M 50/116 |
| | | | | 429/153 |
| 2014/0248517 | A1* | 9/2014 | Yoshioka | ............ H01M 10/425 |
| | | | | 429/90 |
| 2015/0303415 | A1 | 10/2015 | Kayano et al. | |

FOREIGN PATENT DOCUMENTS

| CN | 101877413 A | 11/2010 |
| CN | 103443954 A | 12/2013 |
| | (Continued) | |

OTHER PUBLICATIONS

International Search Report for PCT/JP2017/034874, dated Oct. 31, 2017.

(Continued)

*Primary Examiner* — Maria Laios
*Assistant Examiner* — Bartholomew A Hornsby
(74) *Attorney, Agent, or Firm* — Sughrue Mion, PLLC

(57) ABSTRACT

A battery pack includes a plurality of battery cells each including a laminate film casing from which positive and negative electrode lead tabs are led out in a same direction, and a coupling assisting member that includes a conductive plate member fixing portion that fixes a conductive plate member having first and second main surfaces, and first and second slit portions provided on the first and second main surface sides of the conductive plate member, respectively. Either of the positive and negative lead tabs of one battery cell is inserted through the first slit portion and conductively connected to the first main surface. A lead tab of a battery cell adjoining one battery cell and having a polarity different from that of the lead tab of the one battery cell, is inserted through the second slit portion and conductively connected to the second main surface.

9 Claims, 21 Drawing Sheets

(56) References Cited

FOREIGN PATENT DOCUMENTS

| | | | |
|---|---|---|---|
| JP | 2003-323879 | A | 11/2003 |
| JP | 2007-109548 | A | 4/2007 |
| JP | 2007-220544 | A | 8/2007 |
| JP | 2013-105700 | A | 5/2013 |
| JP | 2014-053104 | A | 3/2014 |
| JP | 2015153486 | A * | 2/2015 |
| JP | 2015-153486 | A | 8/2015 |
| JP | 2015-207437 | A | 11/2015 |
| WO | 2012/131802 | A1 | 10/2012 |

OTHER PUBLICATIONS

Office Action dated Jul. 30, 2021 in Chinese Application No. 201780087213.4.

* cited by examiner

BATTERY PACK AND METHOD FOR MANUFACTURING BATTERY PACK

This application is a National Stage of International Application No. PCT/JP2017/034874 filed Sep. 27, 2017, claiming priority based on Japanese Patent Application No. 2017-042977 filed Mar. 7, 2017.

TECHNICAL FIELD

The present invention relates to a battery pack accommodating a battery coupling structure formed by connecting battery cells such as lithium ion secondary batteries, and a method for manufacturing the same.

BACKGROUND ART

Lithium ion batteries having high energy density and light weight has been increasingly used as battery cells mounted in a battery pack container. Laminate batteries using a laminate film made of a flexible aluminum sheet of several tens to several hundreds of micrometers in thickness and a resin as a casing are particularly light in weight and are expected to be used for various applications.

A battery using a laminate film casing is configured so that an electrode stack formed by stacking a plurality of positive electrodes and a plurality of negative electrodes via separators and an electrolyte solution with which the electrode stack is impregnated are accommodated inside the laminate film casing, and the rims of the laminate film casing are heat sealed.

Battery cells using a flexible laminate film as the casing excel in terms of weight reduction but have a problem of low strength and vulnerability to external impact, compared to square batteries and cylindrical batteries having a thick, large metal plate casing.

If a battery pack is connected to a device that needs a large battery capacity and the like, a plurality of battery cells inevitably needs to be connected for use. If a plurality of laminate type battery cells is accommodated in a battery pack, the battery cells are either stacked in a stacking direction or arranged in a row in parallel with the inside surface of the outer case.

For example, Patent Document 1 (WO/2012/131802) discloses a battery pack accommodating a battery coupling structure in which unit batteries 100 are stacked and connected by a substrate 300. Patent Document 1: WO/2012/131802

DISCLOSURE OF THE INVENTION

Problems to be Solved by the Invention

Attempts have been made in recent years to use flying objects such as a drone in business and other fields. Since a battery pack mounted on a flying object needs to have high energy density and light weight, it makes sense to use a battery pack including a battery cell with a laminate film casing.

On the other hand, if the battery pack to be mounted on a flying object includes a plurality of battery cells connected to obtain high output, the connections need to have high resistance against impact and high resistance against vibrations.

However, battery packs according to the conventional technique have had a problem of fragility to impact and vibrations since mechanical fixing means such as bolts are used to electrically connect the lead tabs of the battery cells.

Conventional battery packs have also had a problem of increased weight since bolts are used to electrically connect the lead tabs of the battery cells.

In a conventional battery pack, the lead tabs of the battery cells are bent at 90° when the lead tabs are electrically connected to each other. There has thus been a problem of a drop in the performance of the battery cells because such bending applies an external force to the battery cells themselves.

The conventional technique has also had a problem of complicated manufacturing steps and high cost because electrically connecting the lead tabs as described above needs the steps of bending the lead tabs at 90°, stacking and positioning the battery cells one by one, and fastening the same by bolts.

Means for Solving the Problems

The present invention is intended to solve the foregoing problems. A battery pack according to the present invention is a battery pack including a stack of a plurality of battery cells that each include a positive electrode lead tab and a negative electrode lead tab led out of a laminate film casing in a same direction, and a coupling assisting member that assists in electrically connecting adjoining battery cells, wherein: the coupling assisting member includes a conductive plate member fixing portion that fixes a conductive plate member having a first main surface and a second main surface in a front-to-back relationship with the first main surface, a first slit portion provided on the first main surface side of the conductive plate member, and a second slit portion provided on the second main surface side of the conductive plate member; either one of the positive and negative lead tabs of one battery cell is inserted through the first slit portion and conductively connected to the first main surface of the conductive plate member; and a lead tab of a battery cell adjoining the one battery cell, the lead tab having a polarity different from that of the lead tab of the one battery cell, is inserted through the second slit portion and conductively connected to the second main surface of the conductive plate member.

In the battery pack according to the present invention, the coupling assisting member includes a guide plate that, when a lead tab of a battery cell is inserted through the first slit portion or the second slit portion, guides an end of the lead tab toward the first slit portion or the second slit portion.

In the battery pack according to the present invention, a position where either one of the positive and negative lead tabs of the one battery cell is inserted through the first slit portion and conductively connected to the first main surface of the conductive plate member and a position where the lead tab of the battery cell adjoining the one battery cell, the lead tab having the polarity different from that of the lead tab of the one battery cell, is inserted through the second slit portion and conductively connected to the second main surface of the conductive plate member do not overlap as seen in a thickness direction of the conductive plate member.

In the battery pack according to the present invention, the conductive plate member fixing portion of the coupling assisting member includes a conductive plate member sandwiching portion that sandwiches the conductive plate member.

In the battery pack according to the present invention, the conductive plate member fixing portion of the coupling assisting member includes a conductive plate member latch portion that latches the conductive plate member.

In the battery pack according to the present invention, a notch for the conductive plate member latch portion to be engaged with is formed in the conductive plate member.

In the battery pack according to the present invention, a terminal piece is formed on the conductive plate member.

In the battery pack according to the present invention, a substrate having a through hole for the terminal piece to run through is placed on the coupling assisting member.

A method for manufacturing a battery pack according to the present invention is a method for manufacturing a battery pack including a stack of a plurality of battery cells that each include a positive electrode lead tab and a negative electrode lead tab led out of a laminate film casing in a same direction, and a coupling assisting member that assists in electrically connecting adjoining battery cells, the coupling assisting member including a conductive plate member fixing portion that fixes a conductive plate member having a first main surface and a second main surface in a front-to-back relationship with the first main surface, a first slit portion provided on the first main surface side of the conductive plate member, and a second slit portion provided on the second main surface side of the conductive plate member, the method including the steps of: inserting either one of the positive and negative lead tabs of one battery cell into the first slit portion and conductively connecting the lead tab to the first main surface of the conductive plate member; and inserting a lead tab of a battery cell adjoining the one battery cell, the lead tab having a polarity different from that of the lead tab of the one battery cell, into the second slit portion and conductively connecting the lead tab to the second main surface of the conductive plate member.

Advantageous Effects of the Invention

According to the battery pack of the present invention, a battery pack having light weight, resistant to mechanical vibrations and impact, and having excellent manufacturability can be provided.

According to the method for manufacturing a battery pack of the present invention, a battery pack having light weight and resistant to mechanical vibrations and impact can be easily manufactured.

BEST MODE FOR CARRYING OUT THE INVENTION

Figure 1:
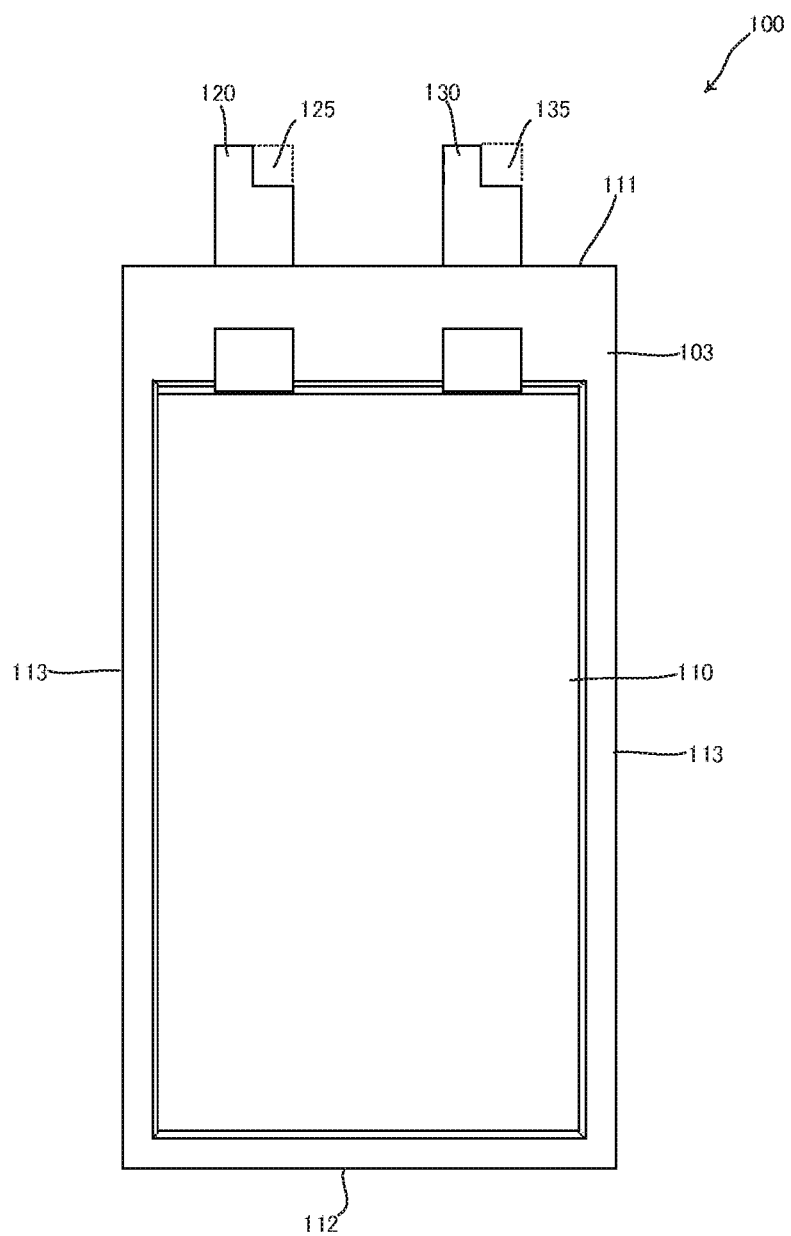
FIG. 1 is a diagram showing a battery cell 100 used in a battery pack 700 according to an embodiment of the present invention.

An embodiment of the present invention will be described below with reference to the drawings. FIG. 1 is a diagram showing a battery cell 100 used in a battery pack 700 according to the embodiment of the present invention. A lithium ion secondary unit battery which is charged and discharged by movement of lithium ions between negative and positive electrodes is used as the battery cell 100.

A battery main body unit 110 of the battery cell 100 is configured so that an electrode stack including a plurality of sheet-like positive electrodes and a plurality of sheet-like negative electrodes stacked via separators and an electrolyte solution (neither of which is shown in the diagram) are accommodated in a laminate film casing 103 having a rectangular shape in a plan view. A positive electrode lead tab 120 and a negative electrode lead tab 130 are led out of a first end portion 111 of the battery main body unit 110.

The positive electrode lead tab 120 and the negative electrode lead tab 130 both have a flat plate shape and are connected to the sheet-like positive electrodes and the sheet-like negative electrodes, respectively, inside the laminate film casing 103 either directly or via lead members or the like. The laminate film casing 103 is made of a metal laminate film having a heat sealing resin layer on a surface falling on the inner side of the battery. More specifically, for example, two metal laminate films are stacked to constitute the laminate film casing 103. With the electrode stack including the sheet-like positive electrodes, the sheet-like negative electrodes, and the separators and the electrolyte solution accommodated inside, an outer periphery (the first end portion 111, a second end portion 112, and two side end portions 113) of the laminate film casing is thermally sealed to hermetically close the interior.

As employed herein, metal pieces led out of the battery main body unit 110 including the laminate film casing 103, like the positive electrode lead tab 120 and the negative electrode lead tab 130, will be referred to as "lead tabs". The sheet-like positive electrodes and the sheet-like negative electrodes stacked inside the laminate film casing 103 via the separators, the electrolyte solution, and the like will be referred to as "electrodes".

Aside from one constituted by stacking a plurality of sheet-like positive electrodes and a plurality of sheet-like negative electrodes via separators as described above, electrode stacks may also include one constituted by stacking a sheet-like positive electrode and a sheet-like negative electrode via a separator, and winding and compressing the same.

In the battery cell 100 described above, aluminum or an aluminum alloy is typically used as the material of the positive electrode lead tab 120. Nickel, a material formed by plating another metal with nickel (nickel-plated material, such as nickel-plated copper), or another metal cladded with nickel (nickel-cladded material, such as nickel-cladded copper) is typically used as the material of the negative electrode lead tab 130. In other words, the battery cell 100 includes a positive electrode lead tab 120 containing aluminum and a negative electrode lead tab 130 containing nickel. In the present embodiment, a positive electrode lead tab 120 made of aluminum and a negative electrode lead tab 130 made of nickel are used.

In the battery cell 100 used in the battery pack 700 according to the invention, a rectangular notch 125 is formed in the positive electrode lead tab 120 and a rectangular notch 135 in the negative electrode lead tab 130 in advance for the sake of convenience in manufacturing the battery pack 700. The role of the notches in the positive electrode lead tab 120 and the negative electrode lead tab 130 in the manufacturing steps will be described later.

Figure 2:
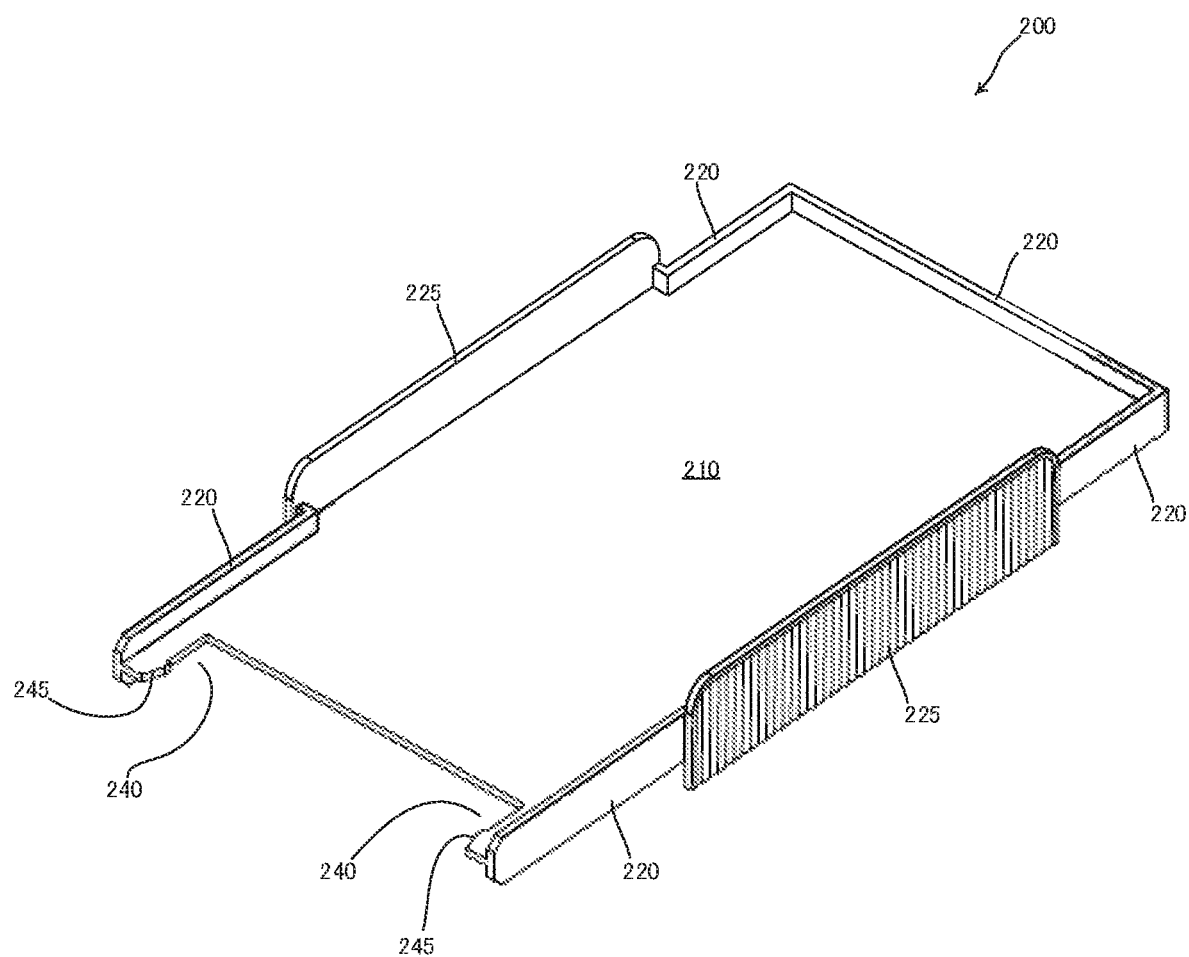
FIG. 2 is a diagram showing a reinforcing member 200 used in the battery pack 700 according to the embodiment of the present invention.

Next, a reinforcing member 200 used in stacking a plurality of battery cells 100 will be described. FIG. 2 is a diagram showing the reinforcing member 200 used in the battery pack 700 according to the embodiment of the present invention.

The reinforcing member 200 is a member made of synthetic resin and has the role of reinforcing a stack of battery cells 100 in stacking a plurality of battery cells 100.

The reinforcing member 200 includes a flat plate portion 210 of substantially rectangular shape which makes contact with an electrode stacking region 105 of the laminate film casing 103 of a battery cell 100 when battery cells 100 are stacked.

Rim portions 220 extending in a direction perpendicular to the main surface directions of the flat plate portion 210 are provided on three sides of the flat plate portion 210 of substantially rectangular shape. Handle portions 225 extending further from the rim portions 220 are provided on two opposed sides of the flat plate portion 210 of substantially rectangular shape. The handle portions 225 serve as handles for improving the handling of the stack of battery cells 100.

For that purpose, a periodic texture pattern is formed on the handle portions 225 so that appropriate friction can be produced. The handle portions 225 can also be used when a battery coupling structure 500 or a battery pack 700 is completed.

The reinforcing member 200 includes two protrusions 240 extending from the two opposed sides of the flat plate portion 210 of substantially rectangular shape. The protrusions 240 are formed on the reinforcing member 200 so that when a stack of battery cells 100 is formed by using the reinforcing member 200, the protrusions 240 protrude in the same direction as that in which the positive electrode lead tabs 120 and the negative electrode lead tabs 130 of the battery cells 100 are led out. The protrusions 240 are configured to be engaged with recessed guides 340 that are guide portions of a coupling assisting member 300 to be described later. Latch pieces 245 are provided on the end side of the protrusions 240. The latch pieces 245 are used to securely fix the reinforcing member 200 to the coupling assisting member 300.

Next, a method for stacking a plurality of battery cells 100 configured as described above and electrically connecting the adjoining battery cells 100 to form a battery coupling structure 500, and thereby manufacturing a battery pack 700 will be described.

Figure 3:
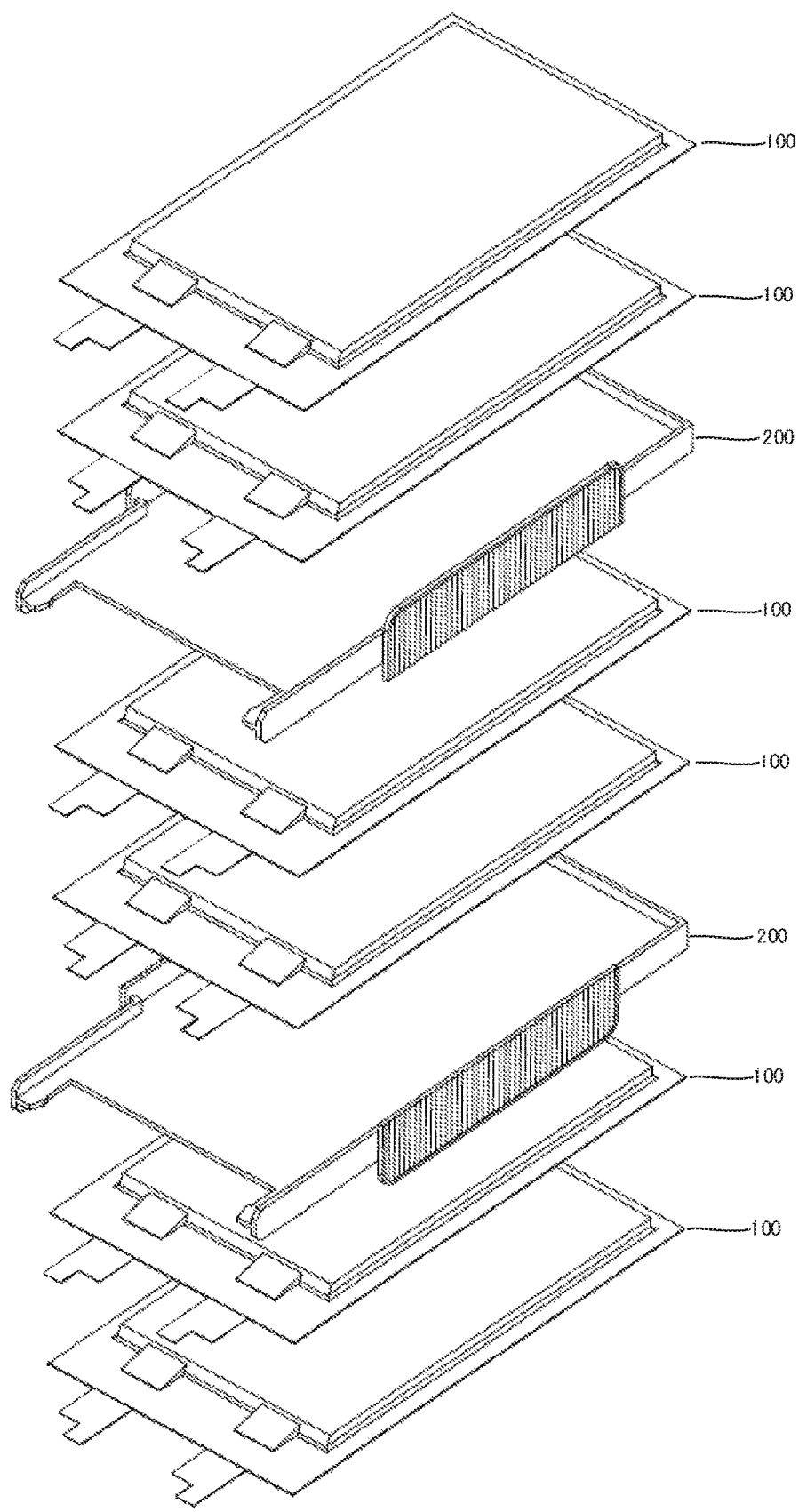
FIG. 3 is a diagram showing a manufacturing step of the battery pack 700 according to the embodiment of the present invention, a diagram showing the order of stacking of battery cells 100 and reinforcing members 200.
Figure 4:
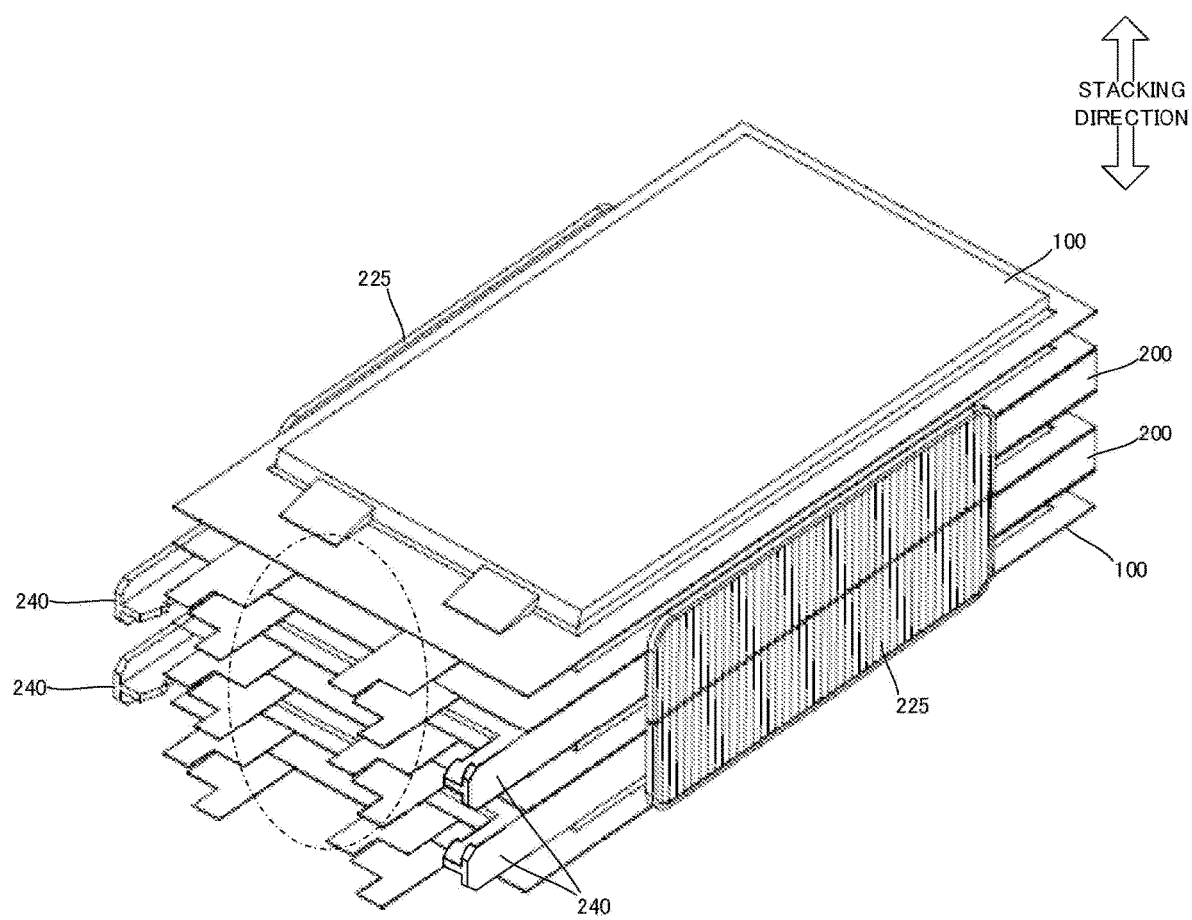
FIG. 4 is a diagram showing a stack of battery cells 100 and reinforcing members 200.

FIG. 3 is a diagram showing a manufacturing step of the battery pack 700 according to the embodiment of the present invention, a diagram showing the order of stacking of battery cells 100 and reinforcing members 200. FIG. 4 is a diagram showing a stack of battery cells 100 and reinforcing members 200.

The battery cells 100 and the reinforcing members 200 are stacked by using a not-shown double-sided adhesive tape so that the members are firmly bonded to each other. In the present embodiment, a battery coupling structure 500 including six battery cells 100 connected in series is intended to be formed. However, in the battery pack 700 according to the present invention, the number of battery cells 100 connected in series may be arbitrary.

In the present embodiment, the stack is formed to include two battery cells 100, a reinforcing member 200, two battery cells 100, a reinforcing member 200, and two battery cells 100 in order as shown in the diagram.

Attention will be focused on the portion encircled by a dot-dashed line in FIG. 4. The flat plate portions 210 of the reinforcing members 200 interposed between the battery cells 100 are provided to cover the laminate film casings 103 at the first end portions 111 of the battery cells 100 when seen in the stacking direction of the battery cells 100.

This can appropriately protect the relatively-fragile first end portion 111 side of the battery cells 100 from which the positive electrode lead tabs 120 and the negative electrode lead tabs 130 are led out.

Figure 5:
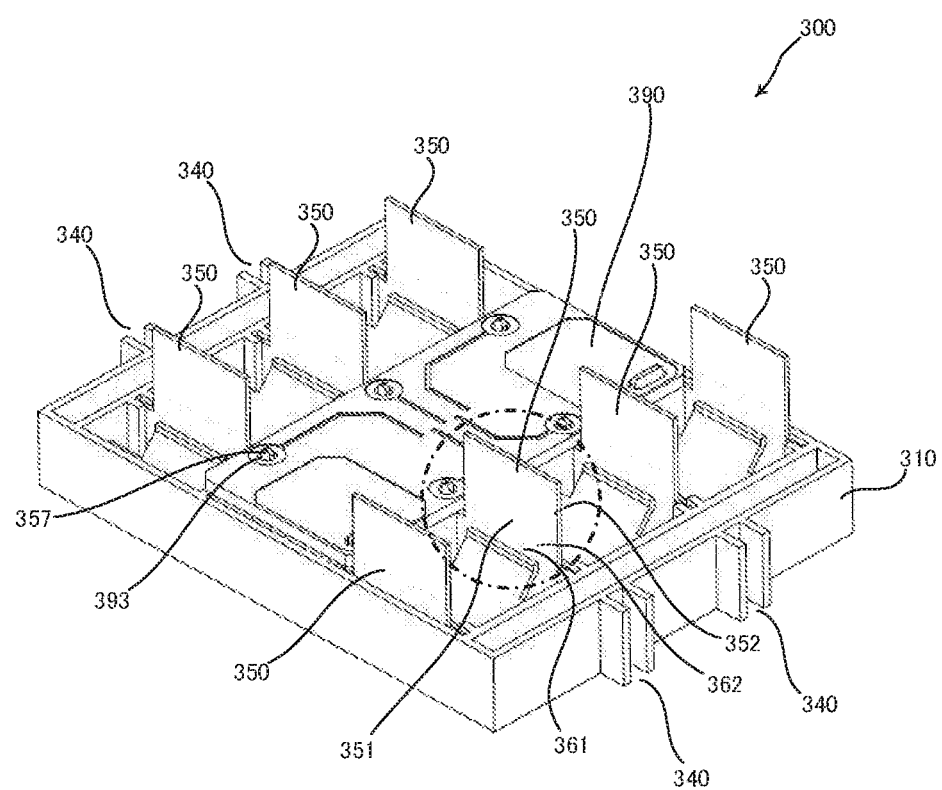
FIG. 5 is a diagram showing a coupling assisting member 300 used in the battery pack 700 according to the embodiment of the present invention.
Figure 6:
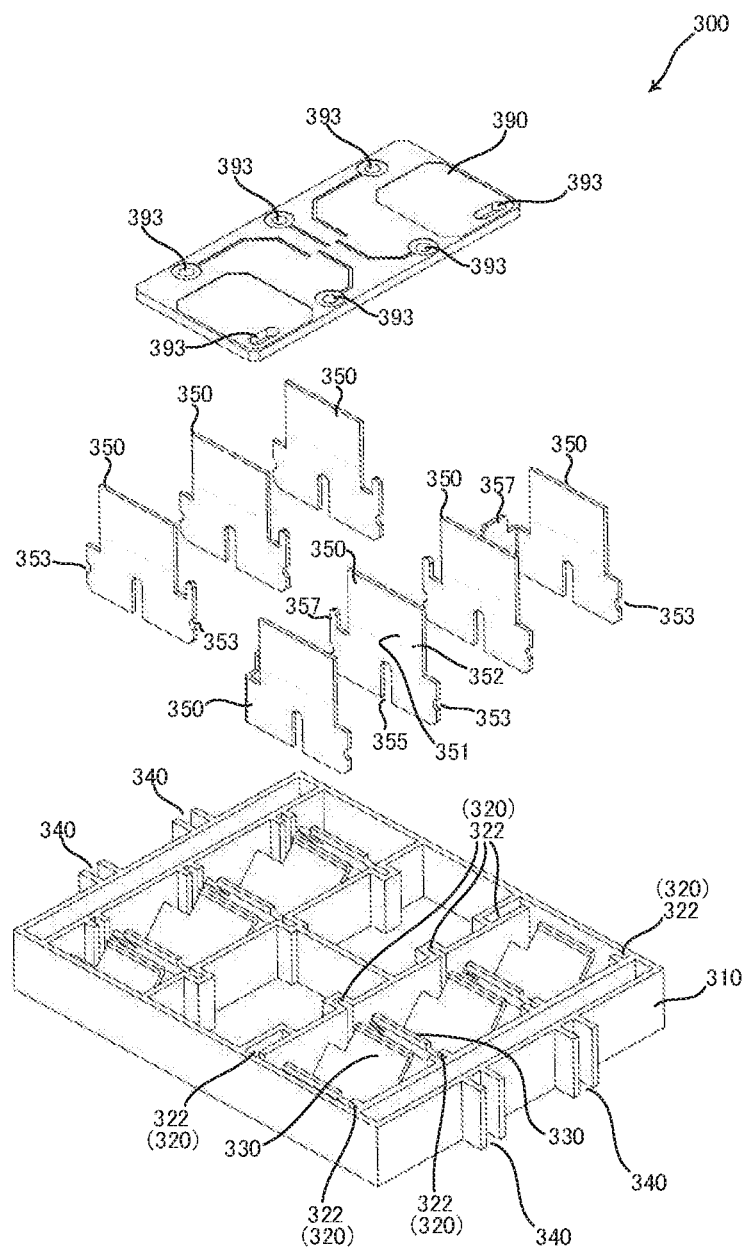
FIG. 6 is an exploded perspective view of the coupling assisting member 300 used in the battery pack 700 according to the embodiment of the present invention.

Next, the coupling assisting member 300 which assists in electrically connecting the adjoining battery cells 100 will be described. FIG. 5 is a diagram showing the coupling assisting member 300 used in the battery pack 700 according to the embodiment of the present invention. FIG. 6 is an exploded perspective view of the coupling assisting member 300 used in the battery pack 700 according to the embodiment of the present invention.

A frame member 310 of substantially rectangular shape, made of synthetic resin or the like is used as a chief base structure of the coupling assisting member 300. Conductive plate members 350 to be used for welding with the lead tabs of the battery cells 100 are implanted in the frame member 310. A substrate 390 is placed on the frame member 310. The conductive plate members 350 can be made of a metal material such as copper.

In the present embodiment, the number of conductive plate members 350 fixed to the frame member 310 is seven. The number can be changed as appropriate based on the number of battery cells 100 to be connected in series.

The two conductive plate members 350 arranged at opposite ends of the frame member 310 are each welded with either the positive electrode lead tab 120 or the negative electrode lead tab 130 at the end side of the battery cells 100 connected in series. The conductive plate members 350 other than the two conductive plate members 350 are each welded with, for example, both the positive electrode lead tab 120 of a battery cell 100 and the negative electrode lead tab 130 of a battery cell 100 adjoining the battery cell 100. In other words, the conductive plate members 350 other than the two conductive plate members 350 are each welded with two lead tabs including either one of the positive and negative lead tabs of one battery cell 100 and a lead tab of a battery cell 100 adjoining the one battery cell 100, the lead tab having a polarity different from that of the lead tab of the one battery cell 100.

Conductive plate member fixing portions 320 that are a structure for fixing the conductive plate members 350 are provided inside the frame member 310 of substantially rectangular shape. The conductive plate member fixing portions 320 for fixing the conductive plate members 350 to the frame member 310 include two types of portions, namely, conductive plate member sandwiching portions 322 and conductive plate member latch portions 325.

The conductive plate member sandwiching portions 322 are slit-like portions capable of sandwiching the conductive plate members 350. The slits of the conductive plate member sandwiching portions 322 have a width approximately the same as the thickness of the conductive plate members 350. The conductive plate member sandwiching portions 322 can sandwich the conductive plate members 350.

Conductive plate member latch portions 325 of protruded shape fitting to two notches 353 formed in the respective conductive plate members 350 are formed at positions not visible in FIGS. 5 and 6. The conductive plate member latch portions 325 can be observed in FIG. 17 which is a sectional view of the frame member 310.

A guide plate 330 is provided on the frame member 310 so as to correspond to each of the two conductive plate members 350 arranged at the opposed ends of the frame member 310. Two guide plates 330 are provided so as to correspond to each of the conductive plate members 350 other than the two conductive plate members 350. Predetermined gaps (first slit portions 361 and second slit portions 362) are formed between the conductive plate members 350 and the guide plates 330. During manufacturing, the guide plates 330 give an appropriate bend to the lead tabs of the battery cells 100 and guide the lead tabs into the gaps (first slit portions 361 and second slit portions 362).

The conductive plate members 350 each have a first main surface 351 and a second main surface 352 in a front-to-back relationship with the first main surface 351. For example, the positive electrode lead tab 120 of a battery cell 100 is welded to the first main surface 351 of a conductive plate member 350, and the negative electrode lead tab 130 of an adjoining battery cell 100 is welded to the second main surface 352.

The conductive plate members 350 each have two notches 353 of recessed shape. The notches 353 are configured to fit to the conductive plate member latch portions 325 of protruded shape on the frame member 310. The conductive plate members 350 are thereby fixed to the frame member 310. The conductive plate members 350 each have a slit portion 355, which facilitates the conductive plate members 350 bending when the notches 353 are fitted to the conductive plate member latch portions 325 of protruded shape.

Terminal pieces 357 are protruded from the conductive plate members 350. When the substrate 390 is placed on the frame member 310, the terminal pieces 357 of the conductive plate members 350 are inserted through respective through holes 393 in the substrate 390.

A metal film wiring pattern (details will be omitted) is formed on the substrate 390. For example, the terminal pieces 357 protruding from the through holes 393 of the substrate 390 are electrically connected to the wiring pattern by soldering or the like. Power lines 610 of the battery cells 100 connected in series and sense lines 620 for sensing the potentials of the respective battery cells 100 can thus be drawn out from the substrate 390.

Two recessed guides (guide portions) 340 are formed on each of two opposed sides of the outer periphery of the substantially rectangular frame member 310. The recessed guides 340 engage with the protrusions 240 of the reinforcing members 200.

In a battery pack according to the conventional technique, a substrate for electrically connecting the lead tabs of the battery cells and a battery protection member on side surfaces of the stacked battery cells are configured to be mutually regulated in position via the battery cells. There has thus been a problem that application of impact or vibrations from outside can cause a break in the relatively fragile lead tabs, lowering the reliability of the battery pack.

According to the conventional technique, there has also been a problem of complicated manufacturing steps and high cost because electrically connecting the lead tabs as described above needs the steps of bending the lead tabs at 90°, stacking and positioning the battery cells one by one, and fastening the same by bolts.

In the battery pack 700 according to the present invention, the reinforcing members 200 for protecting the stacks of a plurality of battery cells 100 and the coupling assisting member 300 for electrically connecting the plurality of battery cells 100 are configured to be fixed to each other so that the relative position between the reinforcing members 200 and the coupling assisting member 300 does not change.

Components for that purpose includes the protrusions 240 of the reinforcing members 200 and the recessed guides 340 formed on the frame member 310 of the coupling assisting member 300. Such components also improve the manufacturability of the battery pack 700.

Figure 7:
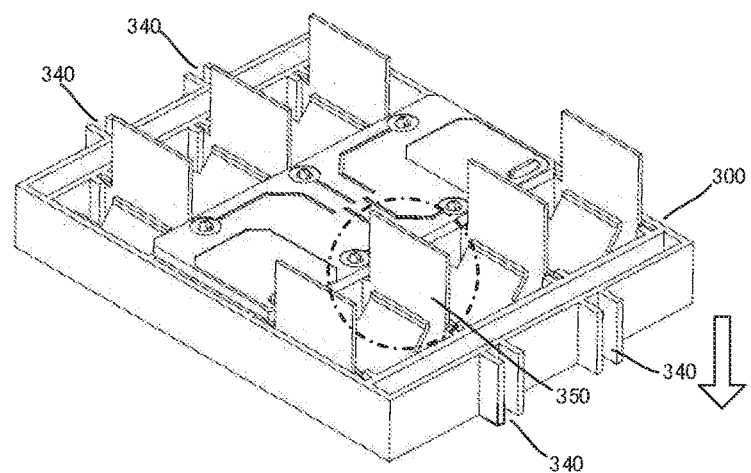
FIG. 7 is a diagram showing a manufacturing step of the battery pack 700 according to the embodiment of the present invention.
Figure 7:
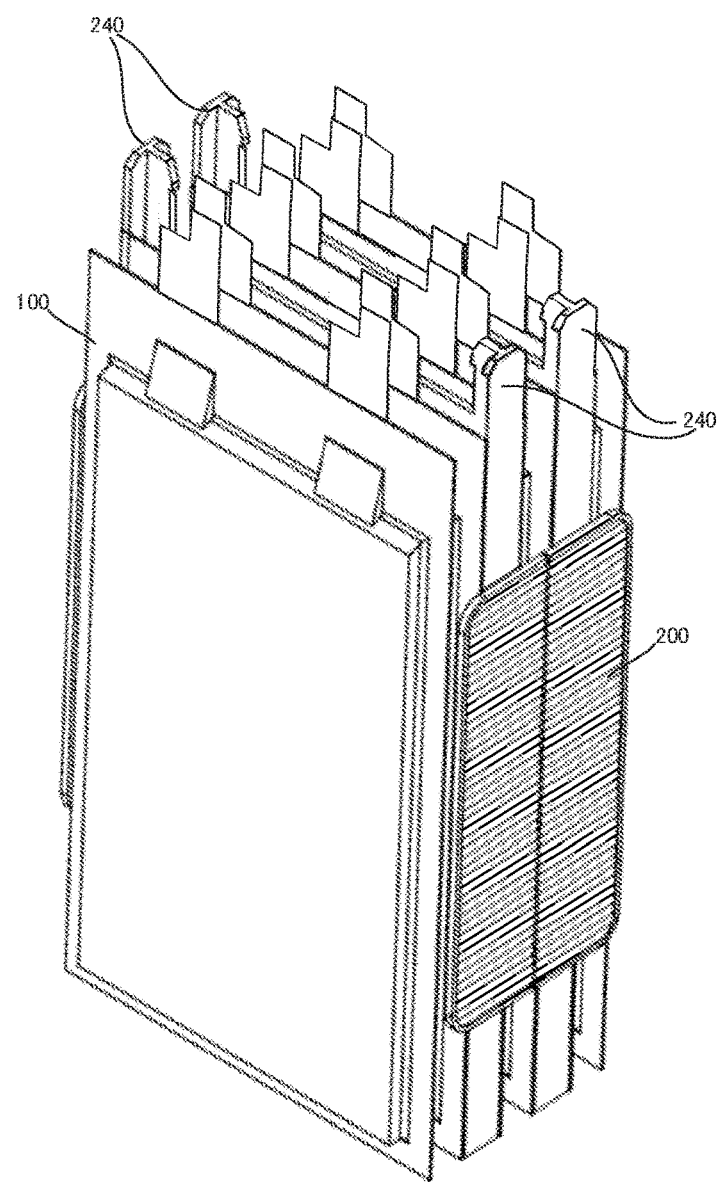

FIG. 7 is a diagram showing a manufacturing step of the battery pack 700 according to the embodiment of the present invention. FIG. 7 shows the step of inserting the lead tabs led out of the battery cells 100 constituting the stack through slit portions formed in the coupling assisting member 300.

To guide the lead tabs of the battery cells 100 into predetermined slit portions, the coupling assisting member 300 is brought closer to the stack of battery cells 100 so that the protrusions 240 of the reinforcing members 200 and the recessed guides 340 formed on the frame member 310 of the coupling assisting member 300 are engaged to regulate the positional relationship.

If the coupling assisting member 300 is brought closer to the stack of battery cells 100 and the insertion of the lead tabs through the predetermined slit portions is completed, the latch pieces 245 at the end side of the protrusions 240 are engaged with the frame member 310 of the coupling assisting member 300. The reinforcing members 200 are thereby fixed to the coupling assisting member 300. This completes the operation for combining the coupling assisting member 300 and the stack of battery cells 100.

Figure 9:
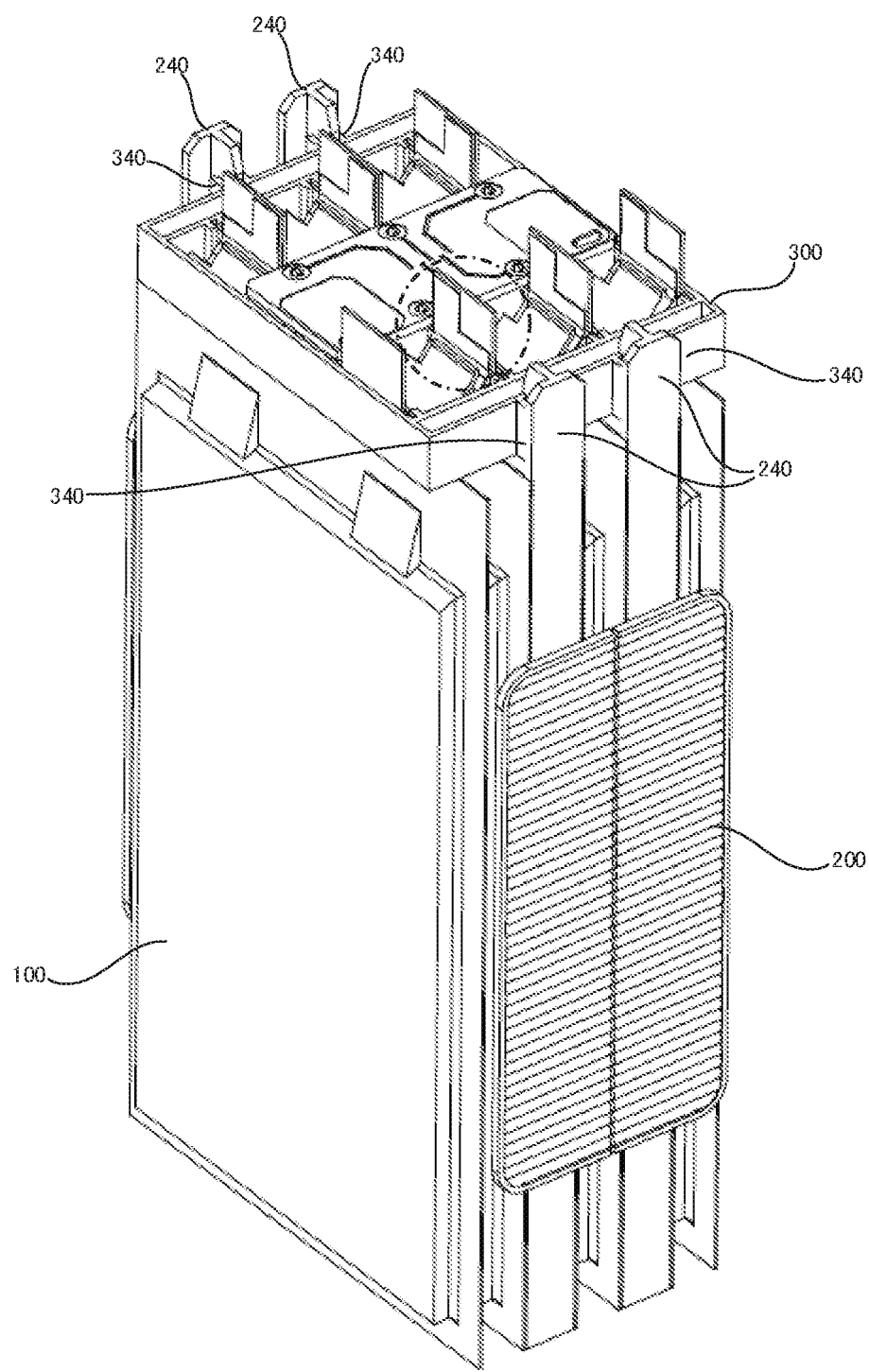
FIG. 9 is a diagram showing a manufacturing step of the battery pack 700 according to the embodiment of the present invention.

FIG. 9 is a diagram showing a manufacturing step of the battery pack 700 according to the embodiment of the present invention. FIG. 9 shows a state where the operation for combining the stack of battery cells 100 and the coupling assisting member 300 is completed.

As described above, according to the battery pack 700 of the present invention, a highly reliable battery pack 700 having excellent manufacturability can be provided.

According to the method for manufacturing the battery pack 700 of the present invention, a highly reliable battery pack 700 can be easily manufactured.

By the way, a battery pack according to the conventional technique has had a problem of fragility to impact and vibrations because mechanical fixing means such as bolts are used in electrically connecting the lead tabs of the battery cells.

The conventional battery pack has also had a problem of increased weight because bolts are used to electrically connect the lead tabs of the battery cells.

In the conventional battery pack, the lead tabs of the battery cells are bent at 90° when the lead tabs are electrically connected. There has also been a problem of a drop in the performance of the battery cells because such bending applies an external force to the battery cells themselves.

The conventional technique has also had a problem of complicated manufacturing steps and high cost because electrically connecting the lead tabs as described above needs the steps of bending the lead tabs at 90°, stacking and positioning the battery cells one by one, and fastening the same by bolts.

The battery pack 700 according to the present invention then solves the foregoing problems of the conventional technique by the use of the coupling assisting member 300 for electrical connection between the battery cells 100.

Figure 8:
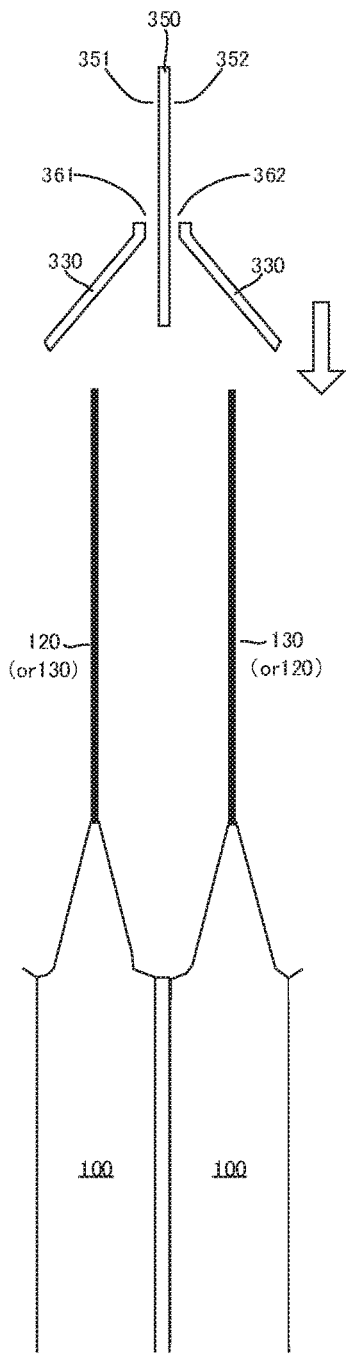
FIGS. 8(A)-8(C) are schematic diagrams showing how lead tabs of battery cells 100 are guided by the coupling assisting member 300.
Figure 8:
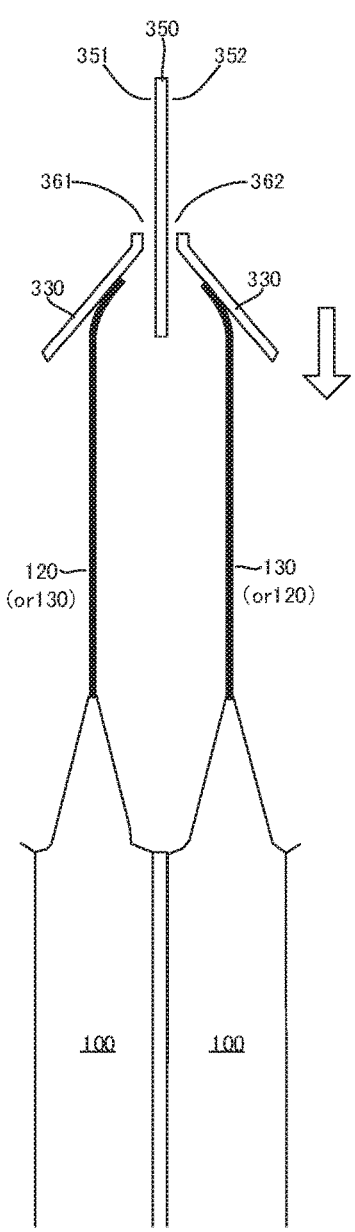
Figure 8:
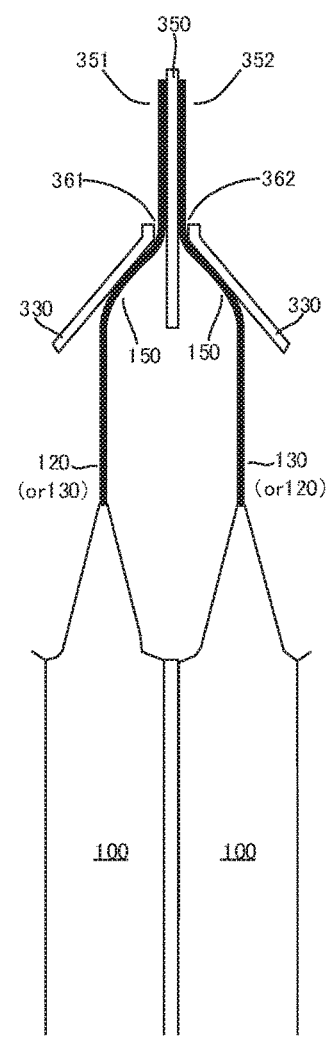

A relationship between the lead tabs of the battery cells 100 and the coupling assisting member 300 in combining the coupling assisting member 300 and the stack of battery cells 100 will initially be described. FIGS. 8(A)-8(C) are schematic diagrams showing how the lead tabs of battery cells 100 are guided by the coupling assisting member 300.

For example, focusing attention on the conductive plate member 350 encircled by a dot-dashed line in FIG. 9, FIGS. 8(A)-8(C) show configuration in the vicinity of the conductive plate member 350 in an extracted manner. Suppose that the left side of the conductive plate member 350 is the first main surface 351 and the right side the second main surface 352. The terms "first" and "second" are only intended to make a distinction between the main surfaces and not to represent any hierarchy.

The slit portion between the first main surface 351 of the conductive plate member 350 and the guide plate 330 will be referred to as a first slit portion 361. The slit portion between the second main surface 352 of the conductive plate member 350 and the guide plate 330 will be referred to as a second slit portion 362.

In FIGS. 8(A)-8(C), the positive electrode lead tab 120 of the left battery cell 100 is assumed to be inserted through the first slit portion 361, and the negative electrode lead tab 130 of the adjoining right battery cell 100 is to be inserted through the second slit portion 362. However, the polarities of the lead tabs may be opposite to such assumption.

FIG. 8A shows a state when the operation for combining the coupling assisting member 300 and the stack of battery cells 100 is started. FIG. 8B shows a state where the combining operation is in process. FIG. 8C shows a state when the combining operation is completed.

As shown in FIG. 8B, in the combining process, the ends of the positive electrode lead tab 120 and the negative electrode lead tab 130 make contact with and are guided along the guide plates 330 toward the first slit portion 361 and the second slit portion 362, respectively.

As the combining process progresses, the positive electrode lead tab 120 and the negative electrode lead tab 130 pass through the first slit portion 361 and the second slit portion 362. The end portions of the positive electrode lead tab 120 and the negative electrode lead tab 130 extend along the first main surface 351 and the second main surface 352 of the conductive plate member 350, respectively.

The positive electrode lead tab 120 and the negative electrode lead tab 130 form bends (vibration transmission ratio changing bends 150 to be described later) where the lead tabs follow and make contact with the guide plates 330.

As described above, in manufacturing the battery pack 700 according to the present invention, the guide plates 330 provided on the coupling assisting member 300 facilitate inserting the lead tabs of the battery cells 100 through predetermined slit portions. This improves manufacturing efficiency.

Next, a step of welding the positive electrode lead tab 120 and the negative electrode lead tab 130 inserted through the slit portions as described above to the first main surface 351 and the second main surface 352 of the conductive plate member 350, respectively, will be described.

A major characteristic of the battery pack 700 according to the present invention is that the lead tabs of the battery cells 100 are electrically connected without using mechanical fixing means such as bolts which are vulnerable to impact and vibrations and cause an increase in weight, but by using ultrasonic welding for welding metal members to each other by application of ultrasonic vibrations.

In ultrasonic welding, objects to be welded are sandwiched between an anvil 1010 and a horn 1020 of an ultrasonic welding apparatus (entire apparatus is not shown), and the horn 1020 is vibrated by ultrasonic waves to form a welded portion between the metal interfaces.

In the present example, the positive electrode lead tab 120 is in contact with the first main surface 351 of the conductive plate member 350, and the negative electrode lead tab 130 is in contact with the second main surface 352. A method of sandwiching the three layers, namely, the positive electrode lead tab 120, the conductive plate member 350, and the negative electrode lead tab 130 between the anvil 1010 and the horn 1020 and forming welds at a time may seem to be capable of efficiently forming welds. However, such a welding method is not usable, because the conductive plate member 350 has a thickness more than twice that of the positive electrode lead tab 120 and the negative electrode lead tab 130.

In manufacturing the battery pack 700 according to the present invention, a welding method of performing the ultrasonic welding of the positive electrode lead tab 120 and the conductive plate member 350 and the ultrasonic welding of the negative electrode lead tab 130 and the conductive plate member 350 independently is then used. Because of using such a welding method, the notch 125 is formed in the positive electrode lead tab 120 and the notch 135 is formed in the negative electrode lead tab 130.

Figure 10A:
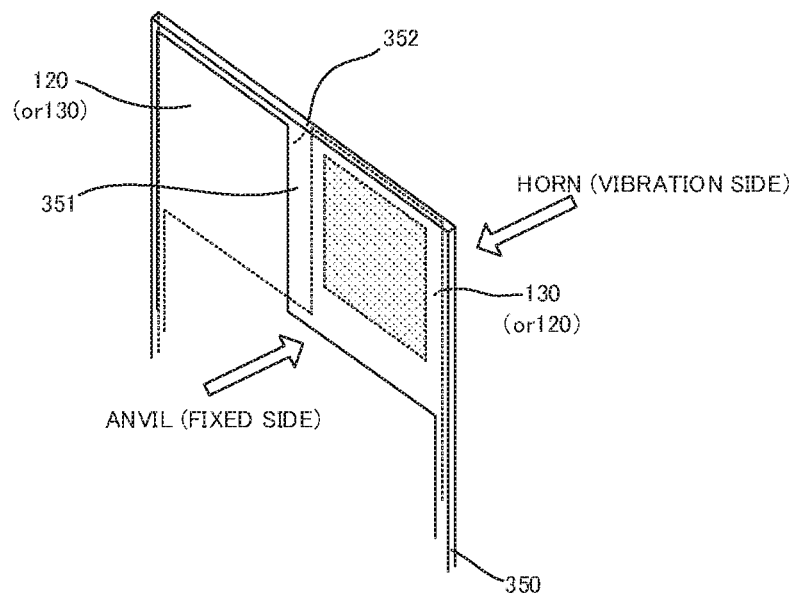
FIGS. 10(A) and 10(B) are diagrams for describing the order of welding of lead tabs and the coupling assisting member 300.
Figure 10B:
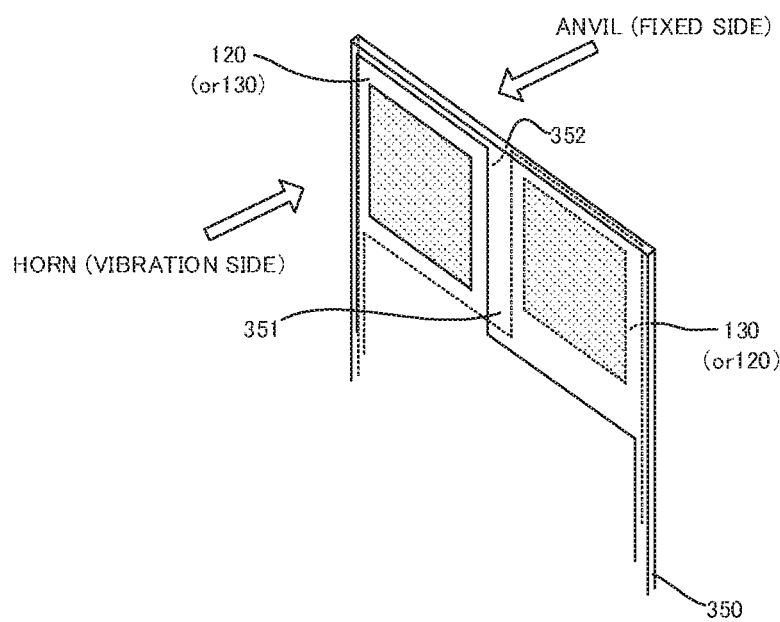
Figure 11A:
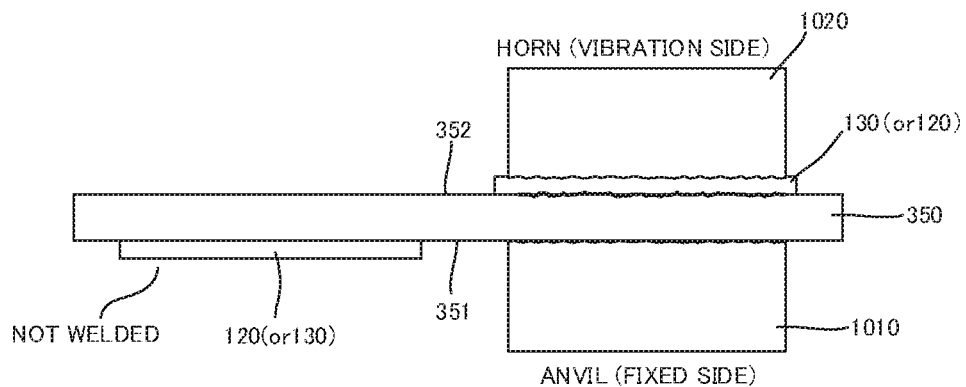
FIGS. 11(A) and 11(B) are diagrams for describing the order of welding of the lead tabs and the coupling assisting member 300 by an ultrasonic welding apparatus.
Figure 11B:
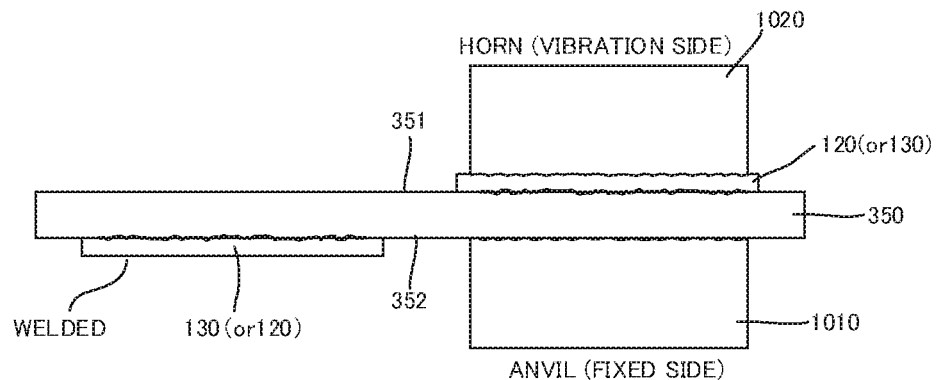

An ultrasonic welding procedure in manufacturing the battery pack 700 according to the present invention will be described below with reference to FIGS. 10(A) and (B) and FIGS. 11(A) and 11(B). FIGS. 10(A) and 10(B) are diagrams for describing the order of welding of the lead tabs and the coupling assisting member 300. FIGS. 11(A) and 11(B) are diagrams for describing the order of welding of the lead tabs and the coupling assisting member 300 by the ultrasonic welding apparatus. Again, description will be given with attention focused on the conductive plate member 350 encircled by a dot-dashed line in FIG. 9.

FIG. 10A is a diagram for describing the welding of the second main surface 352 of the conductive plate member 350 and the negative electrode lead tab 130. Here, as shown in FIG. 11A, the conductive plate member 350 and the negative electrode lead tab 130 are sandwiched between the anvil 1010 and the horn 1020, with the first main surface 351 of the conductive plate member 350 in contact with the anvil 1010 and the negative electrode lead tab 130 in contact with the horn 1020. The horn 1020 is then vibrated to weld the conductive plate member 350 and the negative electrode lead tab 130.

Subsequently, a step of welding the conductive plate member 350 and the positive electrode lead tab 120 is performed. FIG. 10B is a diagram for describing the welding of the first main surface 351 of the conductive plate member 350 and the positive electrode lead tab 120. Here, as shown in FIG. 11B, the conductive plate member 350 and the positive electrode lead tab 120 are sandwiched between the anvil 1010 and the horn 1020, with the second main surface 352 of the conductive plate member 350 in contact with the anvil 1010 and the positive electrode lead tab 120 in contact with the horn 1020. The horn 1020 is then vibrated to weld the conductive plate member 350 and the positive electrode lead tab 120.

As described above, the notch 125 in the positive electrode lead tab 120 and the notch 135 in the negative electrode lead tab 130 are used as locations to make contact with the anvil 1010 in performing welding by the ultrasonic welding apparatus.

The battery pack 700 according to the present invention is also characterized in that the position where the conductive plate member 350 and the positive electrode lead tab 120 are conductively connected by welding and the position where the conductive plate member 350 and the negative electrode lead tab 130 are conductively connected by welding do not overlap as seen in the thickness direction of the conductive plate member 350.

The battery coupling structure 500 can be obtained by welding all the lead tabs inserted through the coupling assisting member 300 to the corresponding conductive plate members 350 by the foregoing welding method.

Figure 12:
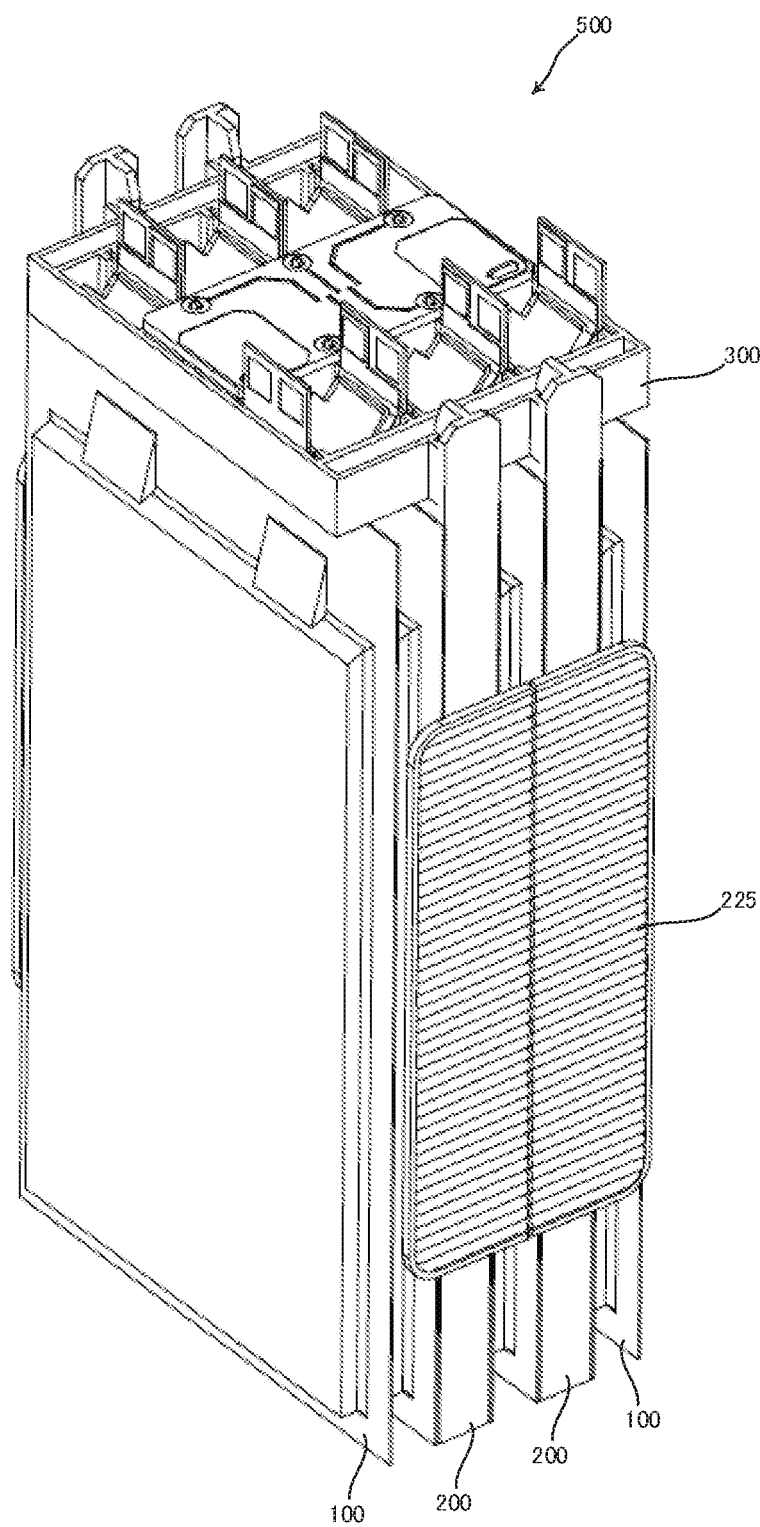
FIG. 12 is a diagram showing a battery coupling structure 500 used in the battery pack 700 according to the embodiment of the present invention.
Figure 13:
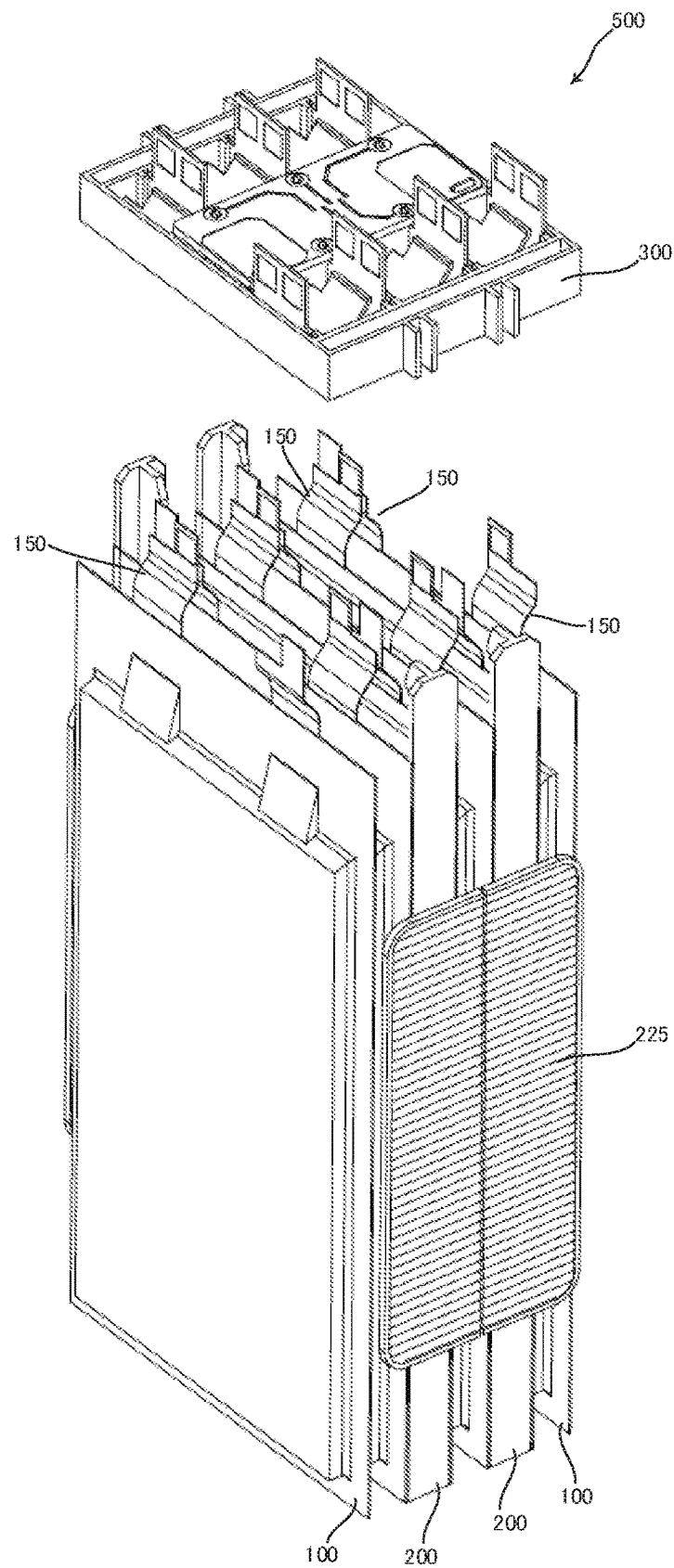
FIG. 13 is an exploded perspective view of the battery coupling structure 500 used in the battery pack 700 according to the embodiment of the present invention.

FIG. 12 is a diagram showing the battery coupling structure 500 used in the battery pack 700 according to the embodiment of the present invention. FIG. 13 is an exploded perspective view of the battery coupling structure 500 used in the battery pack 700 according to the embodiment of the present invention. As shown in FIG. 13, it can be seen that the presence of the guide plates 330 forms the bends (vibration transmission ratio changing bends 150) on the respective lead tabs.

Figure 14:
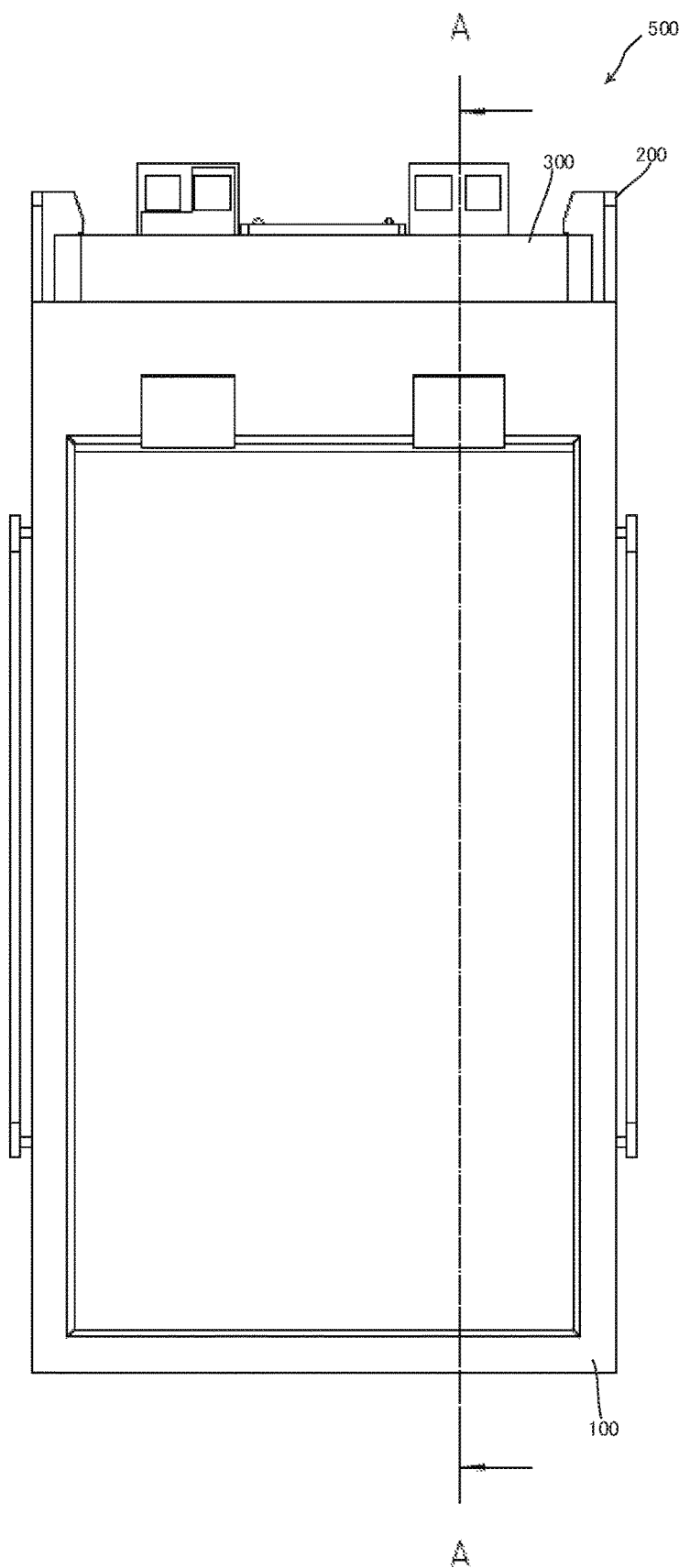
FIG. 14 is a front view of the battery coupling structure 500.
Figure 15:
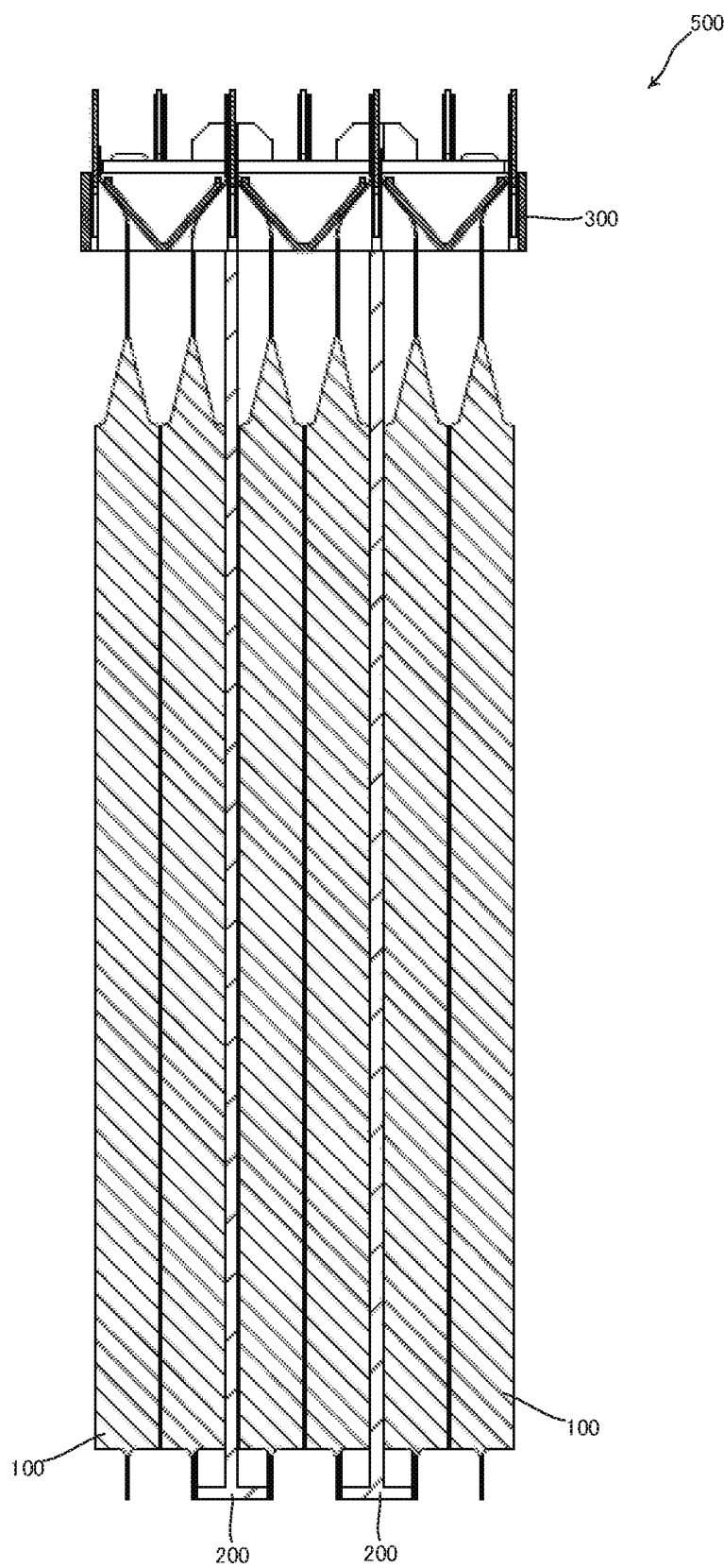
FIG. 15 is a sectional view taken along line A-A shown in FIG. 14.
Figure 16:
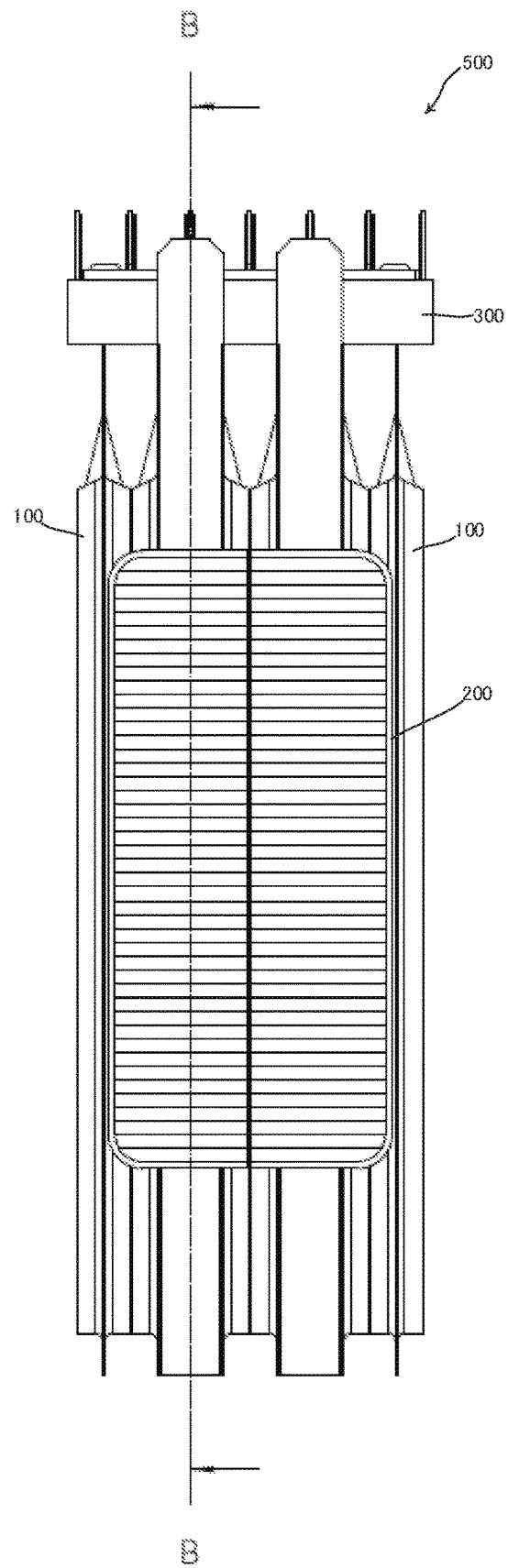
FIG. 16 is a side view of the battery coupling structure 500.
Figure 17:
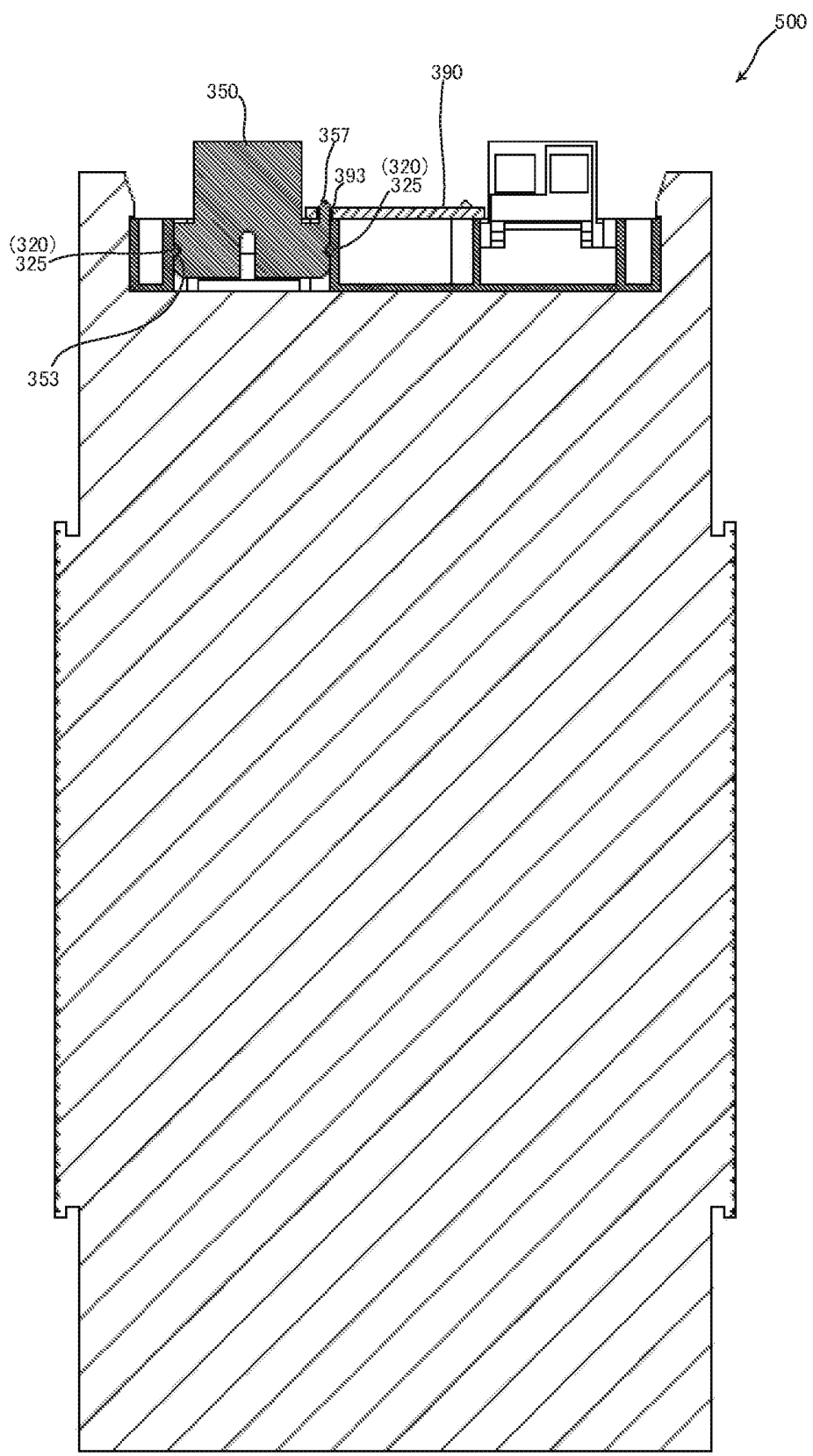
FIG. 17 is a sectional view taken along line B-B shown in FIG. 16.

FIG. 14 is a front view of the battery coupling structure 500. FIG. 15 is a sectional view taken along line A-A shown in FIG. 14. FIG. 16 is a side view of the battery coupling structure 500. FIG. 17 is a sectional view taken along line B-B shown in FIG. 16.

According to the battery pack 700 of the present invention, a battery pack 700 having light weight, resistant to mechanical vibrations and impact, and having excellent manufacturability can be provided by using the battery coupling structure 500 configured as described above.

According to the method for manufacturing the battery pack 700 of the present invention, a battery pack 700 having light weight and resistant to mechanical vibrations and impact can be easily manufactured.

In the present invention, the ultrasonic welding technique is used to weld metal materials such as lead tabs. The application of vibrations to the lead tabs for the sake of ultrasonic welding has had a problem that the vibrations propagate to points where current collector foils and the lead tabs are connected inside the laminate film casings, causing damage such as a drop in connectivity at the points.

Figure 18:
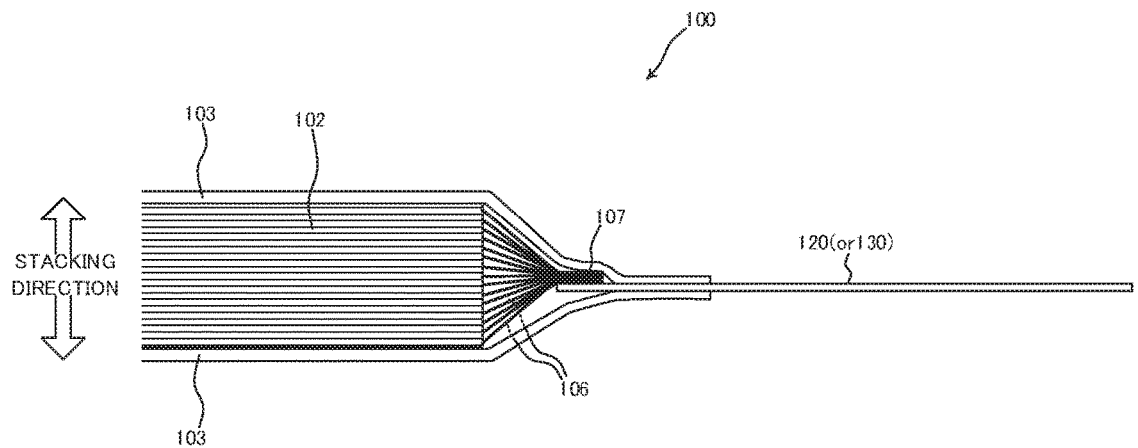
FIG. 18 is a schematic diagram showing an internal structure of a battery cell 100.

FIG. 18 is a schematic diagram showing an internal structure of a battery cell 100. Current collector foils 106 are led out from the electrode stack 102 in the laminate film casing 103, bundled up, and connected to the positive electrode lead tab 120 (or negative electrode lead tab 130) at the bundled part to form a connection portion 107.

Figure 19:
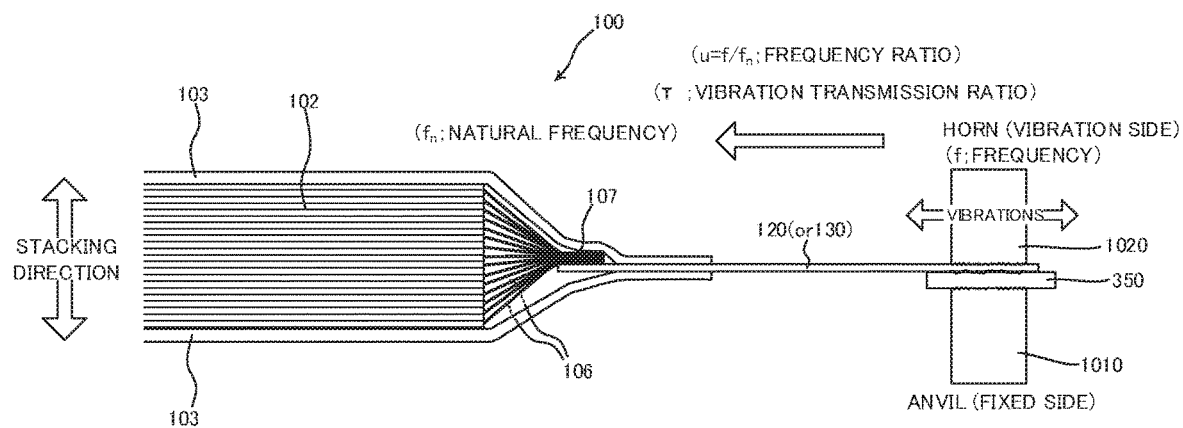
FIG. 19 is a schematic diagram for describing an effect of vibrations in welding a lead tab to the coupling assisting member 300 on the internal structure of the battery cell 100.

FIG. 19 is a schematic diagram for describing an effect of vibrations in welding the lead tab and the coupling assisting member 300 on the internal structure of the battery cell 100. As shown in FIG. 19, the horn 1020 applies ultrasonic vibrations with the conductive plate member 350 and the positive electrode lead tab 120 (or negative electrode lead tab 130) sandwiched between the anvil 1010 and the horn 1020.

A frequency ratio u can be defined as $u=f/f_n$, where $f_n$ is the natural frequency of the battery cell 100 and f is the frequency of the horn 1020. Vibrations transmitted from the horn 1020 to the battery cell 100 can be known from a vibration transmission ratio τ.

Figure 20:
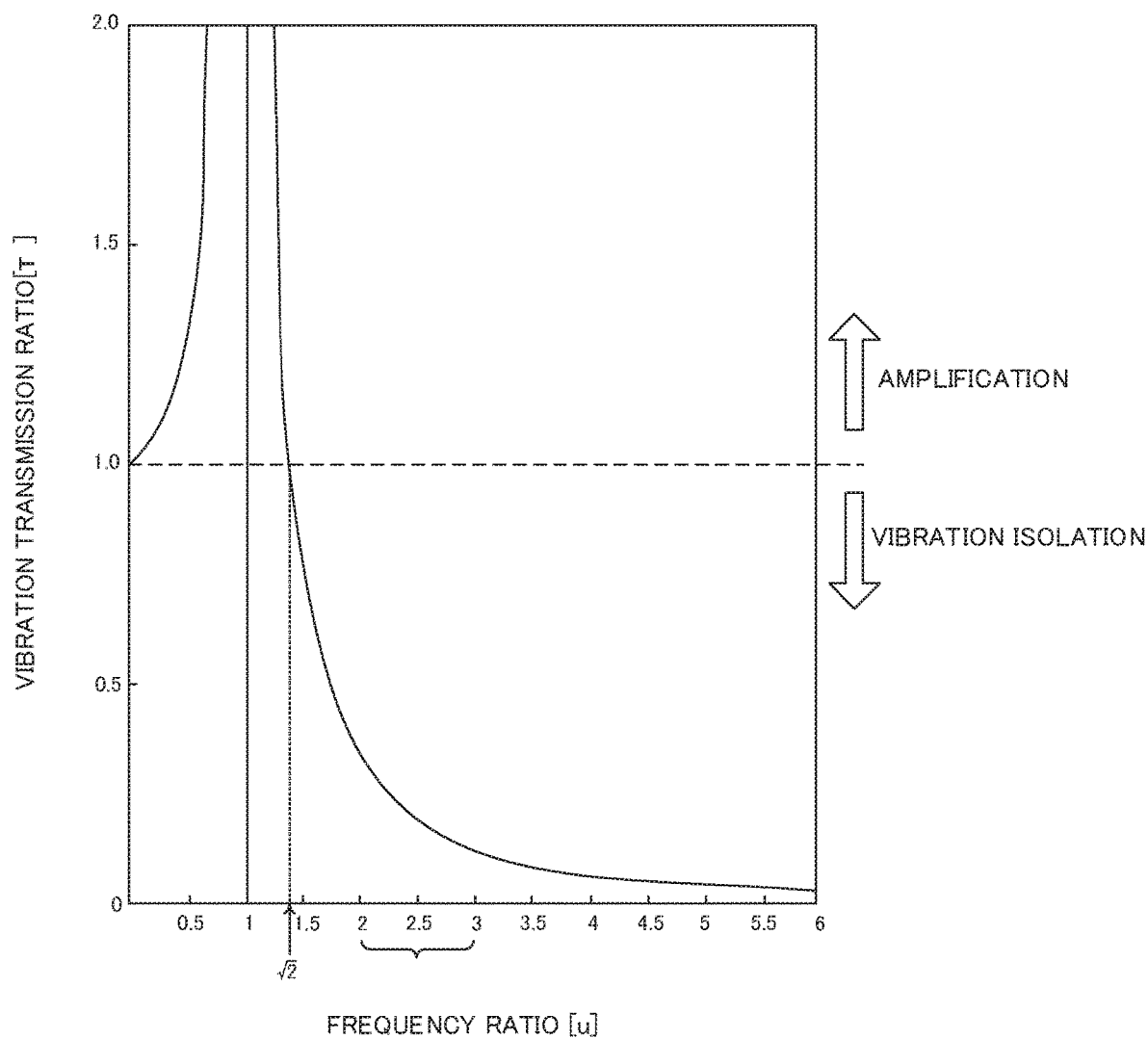
FIG. 20 is a chart showing a relationship between a frequency ratio [u] and a vibration transmission ratio [τ].

FIG. 20 shows a relationship between the frequency ratio u and the vibration transmission ratio τ. Referring to FIG. 20, possible patterns of the relationship can be categorized as follows:

Pattern A:
If (frequency ratio u)<1 or 1<(frequency ratio u)<√2, the vibration transmission ratio τ is 1 or greater. This shows that the vibrations applied from the horn 1020 are amplified when transmitted to the connection portion 107 of the battery cell 100;

Pattern B:
If (frequency ratio u)=1, the vibration transmission ratio τ is infinite. This results in a worst-case state where the vibrations applied from the horn 1020 are amplified to infinite and applied to the connection portion 107 of the battery cell 100; and Pattern C:
If √2<(frequency ratio u), the vibration transmittance ratio τ is less than 1. This shows that the vibrations applied from the horn 1020 are attenuated and transmitted to the connection portion 107 of the battery cell 100. If the frequency ratio u is in the range of 2≤(frequency ratio u)≤3, vibrations are known to be sufficiently attenuated for a vibration isolation effect.

In the welding process of the conductive plate member 350 and the lead tab, the frequency ratio u can enter the category of pattern A or pattern B, depending on the natural frequency $f_n$ of the battery cell 100 and the frequency f of the horn 1020. The gist of the present invention is to bring the vibration transmission ratio τ into the category of pattern C by providing the vibration transmission ratio changing bend 150 on the lead tab.

Figure 21:
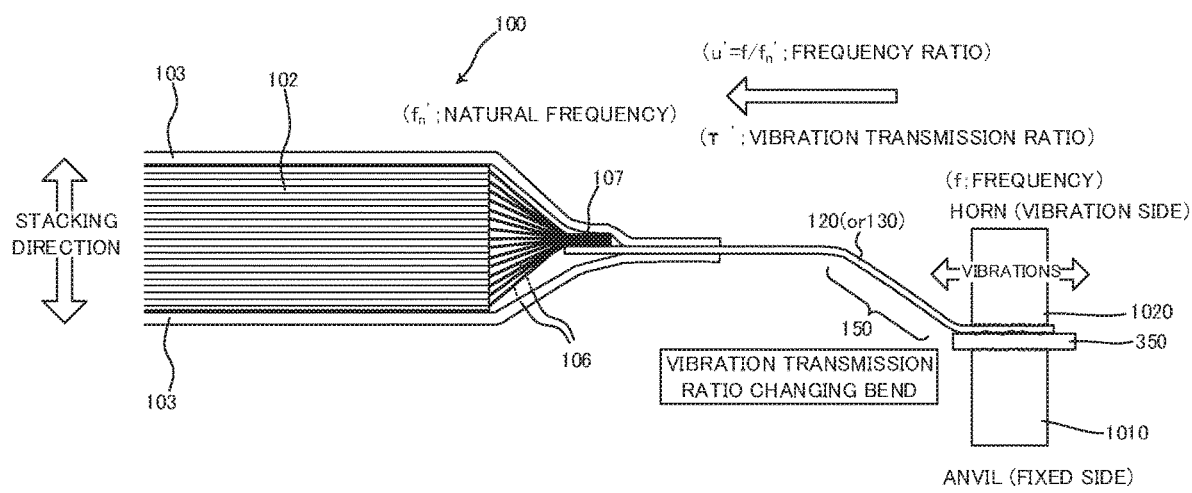
FIG. 21 is a diagram for describing a concept of changing the vibration transmission ratio by providing a vibration transmission ratio changing bend 150 on the lead tab.

FIG. 21 is a diagram for describing the concept of changing the vibration transmission ratio by the provision of the vibration transmission ratio changing bend 150 on the lead tab. In the present embodiment, the vibration transmission ratio changing bend 150 is described to be formed by the guiding plate 330 of the coupling assisting member 300. However, the method for forming the vibration transmission ratio changing bend 150 on the lead tab is not limited to such an example.

As shown in FIG. 21, the formation of the vibration transmission ratio changing bend 150 on the positive electrode lead tab 120 (or negative electrode lead tab 130) changes the natural frequency of the battery cell 100 to $f_n'$. The resulting new frequency ratio $u'=f/f_n'$ can change the vibration transmission ratio to $\tau'$. The vibration transmission ratio changing bend 150 is adjusted so that the new vibration transmission ratio $\tau'$ falls within the category of pattern C.

According to the battery pack 700 of the present invention described above, a highly reliable battery pack 700 without a drop in connectivity between the current collector foils 106 and the lead tabs (120, 130) inside the laminate film casings 103 can be provided.

According to the method for manufacturing the battery pack 700 of the present invention, a highly reliable battery pack 700 without a drop in connectivity between the current collector foils 106 and the lead tabs (120, 130) inside the laminate film casings 103 can be easily manufactured.

Figure 22:
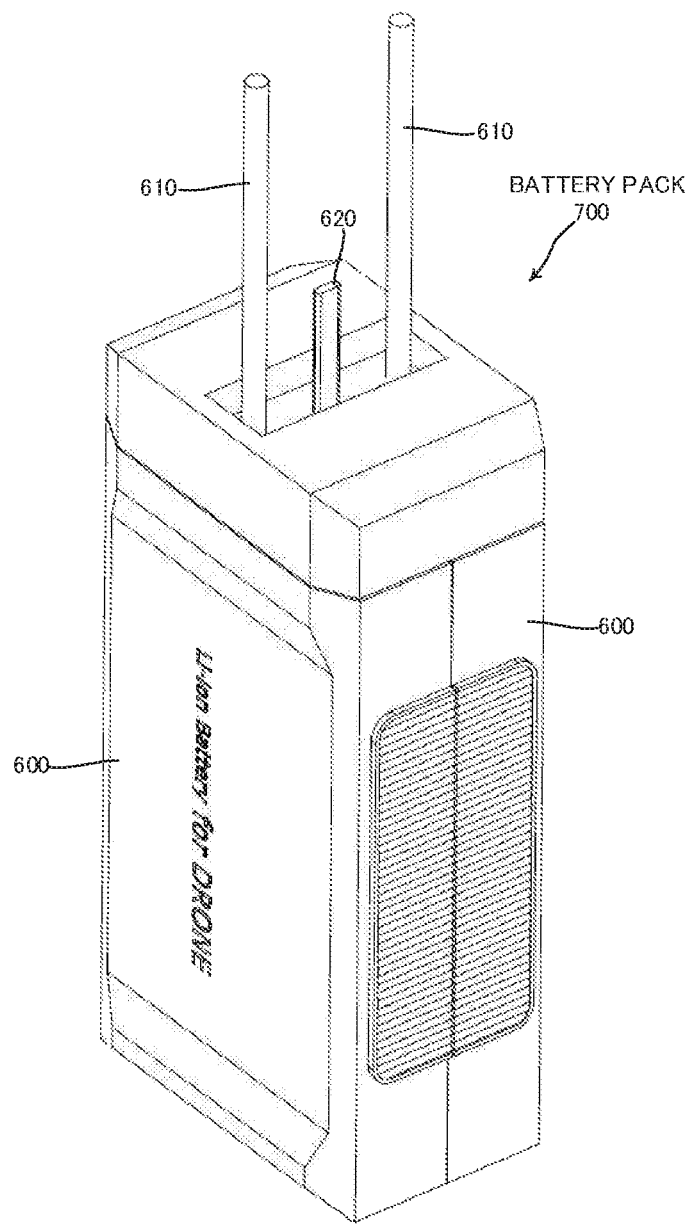
FIG. 22 is a diagram showing the battery pack 700 according to the embodiment of the present invention.

The battery pack 700 according to the present invention can be obtained by connecting the power lines 610 and the sense lines 620 to the substrate 390 of the battery coupling structure 500 shown in FIGS. 12 to 17 via not-shown connectors or the like, and covering the battery coupling structure 500 with a case 600. FIG. 22 is a diagram showing the battery pack 700 according to the embodiment of the present invention.

As described above, according to the battery pack of the present invention, a battery pack having light weight, resistant to mechanical vibrations and impact, and having excellent manufacturability can be provided.

According to the method for manufacturing a battery pack of the present invention, a battery pack having light weight and resistant to mechanical vibrations and impact can be easily manufactured.

According to the battery pack of the present invention, a highly reliable battery pack having excellent manufacturability can be provided.

According to the method for manufacturing a battery pack of the present invention, a highly reliable battery pack can be easily manufactured.

According to the battery pack of the present invention, a highly reliable battery pack without a drop in connectivity between the current collector foils and the lead tabs inside the laminate film casings can be provided.

According to the method for manufacturing a battery pack of the present invention, a highly reliable battery pack without a drop in connectivity between the current collector foils and the lead tabs inside the laminate film casings can be easily manufactured.

INDUSTRIAL APPLICABILITY

Attempts have been made in recent years to use flying objects such as a drone in business and other fields. Since a battery pack mounted on a flying object needs to have high energy density and light weight, it makes sense to use a battery pack including a battery cell with a laminate film casing. If such a battery pack to be mounted on a flying object includes a plurality of battery cells connected to obtain high output, the connections need to have high resistance against impact and high resistance against vibrations.

However, battery packs according to the conventional technique have had a problem of fragility to impact and vibrations since mechanical fixing means such as bolts are used to electrically connect the lead tabs of the battery cells. There has also been a problem of increased weight due to the use of bolts for electrical connection. On the other hand, in the battery pack according to the present invention, the adjoining battery cells are electrically connected by using the coupling assisting member including the conductive plate member fixing portions, the first slit portions, and the second slit portions. According to the battery pack of the present invention, a battery pack having light weight, resistant to mechanical vibrations and impact, and having excellent manufacturability can thus be provided. This provides extremely high industrial applicability.

EXPLANATION OF REFERENCE SYMBOLS

100: battery cell
102: electrode stack
103: laminate film casing
105: electrode stacking region
106: current collector foil
107: connection portion
110: battery main body unit
111: first end portion
112: second end portion
113: side end portion
120: positive electrode lead tab
125: notch
130: negative electrode lead tab
135: notch
150: vibration transmission ratio changing bend
200: reinforcing member
210: flat plate portion
220: rim portion
225: handle portion
240: protrusion
245: latch piece
300: coupling assisting member
310: frame member
320: conductive plate member fixing portion
322: conductive plate member sandwiching portion
325: conductive plate member latch portion
330: guide plate
340: recessed guide (guide portion)
350: conductive plate member
351: first main surface
352: second main surface
353: notch
355: slit portion
357: terminal piece
361: first slit portion
362: second slit portion
390: substrate
393: through hole
500: battery coupling structure
600: case
610: power line
620: sense line
700: battery pack
1010: anvil
1020: horn

The invention claimed is:

1. A battery pack comprising a stack of a plurality of battery cells that each include a positive electrode lead tab and a negative electrode lead tab led out of a laminate film casing in a same direction, and a coupling assisting member that assists in electrically connecting adjoining battery cells, wherein:
- a notch is formed in each of the positive and negative electrode lead tabs of each battery cell of the plurality of battery cells, and
- the coupling assisting member of each battery cell of the plurality of battery cells includes:
  - a conductive plate member fixing portion that fixes a conductive plate member having a first main surface and a second main surface in a front-to-back relationship with the first main surface,
  - a first slit portion provided on the first main surface side of the conductive plate member, and
  - a second slit portion provided on the second main surface side of the conductive plate member; wherein
- either one of the positive and negative electrode lead tabs of one battery cell is inserted through the first slit portion thereof and is conductively connected to the first main surface of the conductive plate member thereof;
- an electrode lead tab, having a polarity different from that of the electrode lead tab of the one battery cell which is inserted through the first slit portion thereof, of another battery cell adjoining the one battery cell, is inserted through the second slit portion of the another battery cell and is conductively connected to the second main surface of the conductive plate member of the another battery cell;
- a position where the one of the positive and negative electrode lead tabs of the one battery cell inserted through the first slit portion thereof and conductively connected to the first main surface of the conductive plate member thereof and a position where the electrode lead tab of the adjoining another battery cell, having the polarity different from that of the electrode lead tab of the one battery cell, and which is inserted through the second slit portion of the another battery cell and which is conductively connected to the second main surface of the conductive plate member of the another battery cell, do not overlap as seen in a thickness direction of the conductive plate member of the another battery cell.

2. The battery pack according to claim 1, wherein the coupling assisting member of each battery cell of the plurality of battery cells includes a guide plate such that, when an electrode lead tab of a battery cell of the plurality of battery cells is inserted through the first slit portion or the second slit portion thereof, the coupling assisting member guides an end of the electrode lead tab toward the first slit portion or the second slit portion.

3. The battery pack according to claim 1, wherein the conductive plate member fixing portion of the coupling assisting member of each battery cell of the plurality of battery cells includes a conductive plate member sandwiching portion that sandwiches the conductive plate member thereof.

4. The battery pack according to claim 1, wherein the conductive plate member fixing portion of the coupling assisting member of each battery cell of the plurality of battery cells includes a conductive plate member latch portion that latches the conductive plate member thereof.

5. The battery pack according to claim 4, wherein in each battery cell of the plurality of battery cells, the conductive plate member includes a notch for the conductive plate member latch portion to be engaged with.

6. The battery pack according to claim 1, wherein in each battery cell of the plurality of battery cells, a terminal piece is formed on the conductive plate member.

7. The battery pack according to claim 6, wherein in each battery cell of the plurality of battery cells, a substrate having a through hole for the terminal piece to run through is placed on the coupling assisting member.

8. A method for manufacturing a battery pack including a stack of a plurality of battery cells that each include a positive electrode lead tab and a negative electrode lead tab led out of a laminate film casing in a same direction, and a coupling assisting member that assists in electrically connecting adjoining battery cells,
the battery pack being configured such that a notch is formed in each of the positive and negative electrode lead tabs of each battery cell of the plurality of battery cells, and
the coupling assisting member of each battery cell of the plurality of battery cells including
  - a conductive plate member fixing portion that fixes a conductive plate member having a first main surface and a second main surface in a front-to-back relationship with the first main surface,
  - a first slit portion provided on the first main surface side of the conductive plate member, and
  - a second slit portion provided on the second main surface side of the conductive plate member,
the method comprising:
inserting either one of the positive and negative electrode lead tabs of one battery cell into the first slit portion thereof and conductively connecting the electrode lead tab to the first main surface of the conductive plate member thereof; and
inserting an electrode lead tab of another battery cell adjoining the one battery cell, the electrode lead tab of the another battery cell having a polarity different from that of the electrode lead tab of the one battery cell, into the second slit portion of the another battery cell and conductively connecting the electrode lead tab to the second main surface of the conductive plate member of the another battery cell,
wherein,
a position where the one of the positive and negative electrode lead tabs of the one battery cell inserted through the first slit portion thereof and conductively connected to the first main surface of the conductive plate member thereof and a position where the electrode lead tab of the adjoining another battery cell, having the polarity different from that of the electrode lead tab of the one battery cell, and which is inserted through the second slit portion of the another battery cell and which is conductively connected to the second main surface of the conductive plate member of the another battery cell, do not overlap as seen in a thickness direction of the conductive plate member of the another battery cell.

9. A battery pack comprising a stack of a plurality of battery cells that each include a positive electrode lead tab and a negative electrode lead tab led out of a laminate film casing in a same direction, and a coupling assisting member that assists in electrically connecting adjoining battery cells, wherein:
- a notch is formed in each of the positive and negative electrode lead tabs of each battery cell of the plurality of battery cells, and
- the coupling assisting member of each battery cell of the plurality of battery cells includes:

a conductive plate member fixing portion that fixes a conductive plate member having a first main surface and a second main surface in a front-to-back relationship with the first main surface, wherein either one of the positive and negative electrode lead tabs of one battery cell of the plurality of battery cells is conductively connected to the first main surface of the conductive plate member of the one battery cell;

an electrode lead tab, having a polarity different from that of the electrode lead tab of the one battery cell which is conductively connected to the first main surface of the conductive plate member of the one battery cell, of another battery cell adjoining the one battery cell, is conductively connected to the second main surface of the conductive plate member of the another battery cell, and a position where the one of the positive and negative electrode lead tabs of the one battery cell conductively connected to the first main surface of the conductive plate member of the one battery cell and a position where the electrode lead tab of the adjoining another battery cell having the polarity different from that of the electrode lead tab of the one battery cell, which is conductively connected to the second main surface of the conductive plate member of the another battery cell do not overlap as seen in a thickness direction of the conductive plate member of the another battery cell.

* * * * *